United States Patent [19]
Munson et al.

[11] Patent Number: 5,699,277
[45] Date of Patent: Dec. 16, 1997

[54] METHOD AND APPARATUS FOR SOURCE CLIPPING A VIDEO IMAGE IN A VIDEO DELIVERY SYSTEM

[75] Inventors: Bill A. Munson, Portland; Matthew A. North, Beaverton, both of Oreg.

[73] Assignee: Intel Corporation, Santa Clara, Calif.

[21] Appl. No.: 582,140

[22] Filed: Jan. 2, 1996

[51] Int. Cl.$^6$ .................................................. H04N 7/15
[52] U.S. Cl. .......................... 364/514 R; 364/514 A; 395/330; 395/342; 348/201; 348/15
[58] Field of Search .................................. 395/330, 114, 395/507, 509, 339, 340, 894, 515, 342, 129, 131; 345/115, 201, 118, 119, 203, 28; 348/15, 460

[56] References Cited

U.S. PATENT DOCUMENTS

| | | | |
|---|---|---|---|
| 4,780,709 | 10/1988 | Randall | 345/27 |
| 4,825,390 | 4/1989 | Van Aken et al. | 364/526 |
| 4,855,813 | 8/1989 | Russell et al. | 358/22 |
| 5,047,755 | 9/1991 | Morita et al. | 345/28 |
| 5,237,517 | 8/1993 | Harrington et al. | 364/526 |
| 5,307,180 | 4/1994 | Williams et al. | 358/448 |
| 5,325,311 | 6/1994 | Yamada et al. | 364/525 |
| 5,375,379 | 12/1994 | Meckstroth | 52/12 |
| 5,390,029 | 2/1995 | Williams et al. | 358/448 |
| 5,469,370 | 11/1995 | Ostrover et al. | 395/894 |
| 5,471,239 | 11/1995 | Hill et al. | 348/155 |
| 5,541,738 | 7/1996 | Mankovitz | 348/460 |
| 5,600,574 | 2/1997 | Reitan | 364/552 |
| 5,619,424 | 4/1997 | Cookson et al. | 395/114 |

FOREIGN PATENT DOCUMENTS

| | | |
|---|---|---|
| 0570139A2 | 5/1992 | European Pat. Off. |
| 2144952 | 7/1983 | United Kingdom |
| 2147772 | 9/1983 | United Kingdom |
| 2180128 | 3/1987 | United Kingdom |

*Primary Examiner*—James P. Trammell
*Assistant Examiner*—Cuong H. Nguyen
*Attorney, Agent, or Firm*—Blakely, Sokoloff, Taylor & Zafman

[57] ABSTRACT

In a video interface coupling a video camera to a host for displaying a video image from the video camera on a graphics display device coupled to the host, a method for clipping an obscured region of a video image, i.e., a region of the video image covered up on the graphics display device by a window in accordance with a window manager. The video image is clipped prior to being buffered in the graphics memory so that only the portion of the video image that is visible on the graphics display device is actually stored in a buffer in graphics memory. The video interface reads a list in main memory on the host. The list comprises at least one strip descriptor and from 1 to 15 tile descriptors per strip descriptor. A strip descriptor comprises a strip start and a strip end. A tile descriptor comprises a tile start and a tile length. The video interface clips the video image according to the strips and tiles in the clip list. For a given strip, clipping of the video image is performed from the tile start for the tile length specified by a tile descriptor while a scan line of the video image is in the range of a strip descriptor, i.e., between a strip start and a strip end specified by the strip descriptor.

4 Claims, 17 Drawing Sheets

METHOD AND APPARATUS FOR SOURCE CLIPPING A VIDEO IMAGE IN A VIDEO DELIVERY SYSTEM

BACKGROUND OF THE INVENTION

1. Field of the Invention

The present invention is related to the field of videoconferencing. In particular, the present invention is related to a method and apparatus for coupling a video camera to a host computer, e.g., a personal computer (PC) for transmitting video images therebetween.

2. Description of Related Art

An interface coupling a video decoder/scaler to a host as embodied in the present invention receives an incoming video signal having n bits per pixel and, prior to transmitting the pixels to a frame buffer or display device on the host, may convert the video signal to m bits per pixel, wherein m<n. For example, the interface may receive n bits per pixel of RGB video input, wherein n equals 24 bits. The interface may then convert the RGB video stream to m bits per pixel, wherein m equals 16.

A prior art conversion technique is to drop the least significant bits of each color component (red, green and blue) for each pixel in the incoming video signal. However, the appearance of contour lines on smooth shaded surfaces may occur when the image represented by the incoming video signal is displayed on the display device. A prior art dithering technique known as "error diffusion" may be utilized to reduce or eliminate the contour lines by adding the discarded least significant bits (LSBs) of each color component of a pixel to the discarded LSBs of the same color component of a previous pixel, thereby producing a carry out. The carry out is then added to the most significant bits (MSBs) of the same color component of the next pixel in the incoming video signal. This minimizes the differences in successive pixels displayed on the display device, which in turn, minimizes the contouring effects. The "error", i.e., the difference between an incoming n bit pixel value and the m bit pixel value that is displayed, is "diffused" over adjacent pixels on the display device.

However, error diffusion can produce a fringing effect on boundaries. What is needed is a method and apparatus for eliminating the fringing effect associated with dithering when converting an n bit per pixel video stream to an m bit per pixel video stream, where m<n.

Interfaces for displaying a video image received from a video camera on a graphics display device of a host system generally need to provide for the delivery of successive fields of video data derived from the incoming video signal to the host system and graphics memory therein. Prior art methods of delivering such data were based on two sets of shadow registers in the interface, wherein one set was utilized for storing even fields, and the other set was utilized for storing odd fields. The shadow registers allowed delivery of video data to two different memory buffers in, e.g., graphics memory. If more than two buffers were required, however, the shadow registers had to be updated by the host's processor under programmatic control, and at the correct time.

For example, with reference to FIG. 1, shadow registers A (704) and B (705) contain destination address information along with configuration information such as whether the video image is planar or packed pixel format, and YUV16, YUV12, or YUV8, etc., format. At the beginning of each incoming video field, as signaled by the vertical sync (VSYNC) signal, one of the shadow registers, e.g., register A, is loaded into the working registers 703 in video DMA controller 106 and the incoming video is stored in one or more areas of PCI memory 111 according to a pointer stored in the shadow register. If successive fields are to be captured, then at the beginning of the next field, the other shadow register, e.g., register B, is loaded into working registers 703, and the incoming video is saved at the memory locations pointed to by the other shadow register. If more than two memory buffers are needed, then the register set that is not being used for capturing video data needs to be updated. This is generally done by interrupting the host's processor at the end of a field and having an interrupt service routine determine which shadow register is in use, and reloading the other shadow register.

NTSC video operates at 60 Hz. Thus, field times are approximately 16.67 milliseconds. As a result, the prior art method described above has a finite time limit placed on it. However, sometimes the processor cannot respond to the interrupt within the finite time limit. In such an event, video fields may be overwritten or lost, or more serious faults could occur if only partial register updates have occurred when the next field of video data is received. Thus, what is needed is a method and apparatus for delivering video data to graphics memory that obviates utilizing shadow registers. Moreover, the method and apparatus should allow for a relatively large number of buffers, wherein the buffers may be managed by a means other than by the host processor.

When a video image is transferred from a video camera to a frame buffer such as graphics memory 113, all or some of the video image may be occluded by other windows being displayed on the graphics display device such as CRT 112. In the prior art, window management was accomplished by means of software routines only. With reference to FIG. 2, applications A (802) and B (803) executing on a host are allocated buffer space in memory 111 in to which windows related thereto may be stored. A windows manager 801 is notified when the buffers are to be copied to graphics memory 113. The windows manager 801 utilizes a windows handle list 804 to determine the location in graphics memory 113 at which to store the buffers. If the window associated with one application is obscuring the window associated with the other application, e.g., if window A (805) obscures window B (806), then windows manager 801 only writes the appropriate areas of the partially obscured window to the frame buffer 113, as illustrated in FIG. 2 with respect to window B (806). The frame buffer contents are scanned and displayed on CRT 112.

In connection with the example illustrated in FIG. 2, if application B (803) is displaying a video sequence rather than a graphics window, then the performance of the host may be somewhat degraded because the windows manager 801 is repeatedly and continuously copying the buffer B from memory 111 to the graphics memory 113, checking for occlusion by other windows, e.g., the window in buffer A, and performing a clipping operation if the window B is to some extent obscured.

With reference to FIG. 3, another prior art windows management method is illustrated. In this case, the graphics memory 113 is divided into on screen memory 113a, and off screen memory 113b that can be accessed by applications. Chroma key logic 810 is coupled between both partitions of graphics memory 113 and the CRT 112. When the chroma key logic 810 detects a "key" color, it displays video data from the off screen portion 113b of graphics memory 113. As in the above discussed prior art, applications are allocated buffer space in memory 111 in to which windows related thereto may be stored. The windows manager 801 is notified when the buffers are to be copied to the graphics memory 113, and utilizes the windows handle list 804 to determine the location in graphics memory 113 at which to display the buffers. However, if one application, e.g., application B (803) in FIG. 3, is attempting to display video data, the application writes the "key" color to its allocated buffer space in memory 111 and have it copied to graphics memory 113 only once, or as necessary. The application then delivers the video data to the off screen memory 113b. As the graphics memory 113 is scanned for display on CRT 112, the chroma key logic 810 is looking for the "key" data in the video stream and automatically switches to the offscreen memory 113b while the "key" is active. If another window is obscuring window B, such as, in FIG. 3, window A, then the "key" data is obscured, and the clipping of the video data is done automatically by the chroma key logic 810.

The approach illustrated in FIG. 3 using chroma key logic is advantageous in that as the video data is updated, the windows manager 801 is not called to copy and clip data from memory 111 to graphics memory 113. However, the approach requires off screen memory 113b in the graphics subsystem, and additional logic 810 to perform the chroma key operation. What is needed is a method and apparatus for clipping video data from a video image that is occluded by another window displayed in CRT 112 that does not require additional off screen memory or chroma key logic.

The PCI bus 115 in FIG. 4 provides a 32 bit interface. In the prior art, PCI based video delivery systems, i.e., video interfaces for coupling a video camera to a PCI bus on a host, had limited the granularity of destination of video images to double word (dword—32 bit) boundaries. When used in a video interface to deliver video data directly to a frame buffer in graphics memory 113, dword granularity may impose unacceptable limitations with respect to the positioning of the video image. Video data may be organized as packed or planar data. In packed mode, all video data is arranged in a single memory space in graphics memory. In planar mode, memory is divided into three separate areas. In either case, what is needed is a method and apparatus for delivering video data to a frame buffer in graphics memory wherein the video image may be stored according to non dword aligned boundaries in the frame buffer.

SUMMARY OF THE DISCLOSURE

The present invention is a method and apparatus for coupling a video camera to a host computer, e.g., a personal computer, for transmitting video images therebetween.

An embodiment of the present invention provides a method and apparatus for preventing visual artifacts when converting a 24 bpp RGB video signal to a 16 bpp RGB video signal. A decimator circuit is utilized for discarding the least significant bits (LSBs) of the red, green and blue color components of a pixel in the RGB video signal. An error diffusion circuit coupled to the decimator circuit adds the LSBs of each of the color components of a pixel in the RGB video signal to the LSBs of the same color components of a previous pixel in the RGB video signal. A carry from the addition is factored into the MSBs of the same color components of a next pixel in the RGB video signal. An edge detector circuit coupled to the error diffusion circuit resets the error diffusion circuit when the MSBs of the color components of the pixel in the RGB video signal are not the same as the MSBs of the color components of the previous pixel in the RGB video stream.

An embodiment of the present invention stores video data received from a video camera in a plurality of video data buffers in graphics memory in the host to which the video camera is coupled. The embodiment allows for a large number of video data buffers. Moreover, the video data buffers are managed by the embodiment, rather than a processor on the host, so that the host's processor may be more fully utilized to perform other tasks. A linked list of commands in memory on the host contain control information, register addresses of registers in the embodiment, and data, which the embodiment utilizes to store received video data in video data buffers.

The present invention further provides a method for clipping a region of a video image that would otherwise be covered up on the graphics display device by a window or other image as determined by a window manager. The video image is clipped prior to being buffered in the graphics memory so that only the portion of the video image that will be visible is actually stored in a frame buffer in graphics memory. The video interface reads a list in main memory on the host, comprising at least one strip descriptor and from 1 to 15 tile descriptors per strip descriptor. Each strip descriptor includes a strip start and a strip end. A tile descriptor includes a tile start and a tile length. The present invention clips the video image according to the strips and tiles in the clip list. For a given strip, clipping of the video image is performed from the tile start for the tile length specified by a tile descriptor while a scan line of the video image is between a strip start and a strip end specified by the strip descriptor.

Thus, it is an object of the present invention to provide a method and apparatus for eliminating the fringing effect associated with dithering when converting an n bit per pixel video stream to an m bit per pixel video stream, where m<n.

It is another object of the present invention to provide a method and apparatus for delivering video data from a video camera and associated video decoder/scaler to graphics memory in a host computer without the need for shadow registers. Moreover, the method and apparatus should allow for a relatively large number of buffers in graphics memory, and the buffers should be managed by a means other than the host computer's processor.

The present invention further provides for a method and apparatus that does not require additional off screen memory or chroma key logic for clipping video data from a video image that is occluded by another window displayed in a graphics display device.

A further object of the present invention is to provide a method and apparatus for delivering video data to a frame buffer in graphics memory wherein the video image may be stored according to non dword aligned boundaries in the frame buffer.

BRIEF DESCRIPTION OF THE DRAWINGS

The present invention is illustrated by way of example and not limitation in the following figures.

DETAILED DESCRIPTION OF THE EMBODIMENTS OF THE INVENTION

The present invention describes a method and apparatus for coupling a video camera to a host computer for transmitting video images therebetween. In the following detailed description, for purposes of explanation, numerous specific details are set forth describing specific embodiments of the present invention, specific hardware platforms upon which certain components may be implemented, method steps, etc., in order to provide a thorough understanding of the present invention. However, it will be apparent to one of ordinary skill in the art that these specific details need not be used to practice the present invention. In other instances, well known devices, circuits, structures, interfaces, and processes have not been shown in detail in order not to unnecessarily obscure the present invention.

Overview of an Embodiment of the Present Invention

Figure 4:
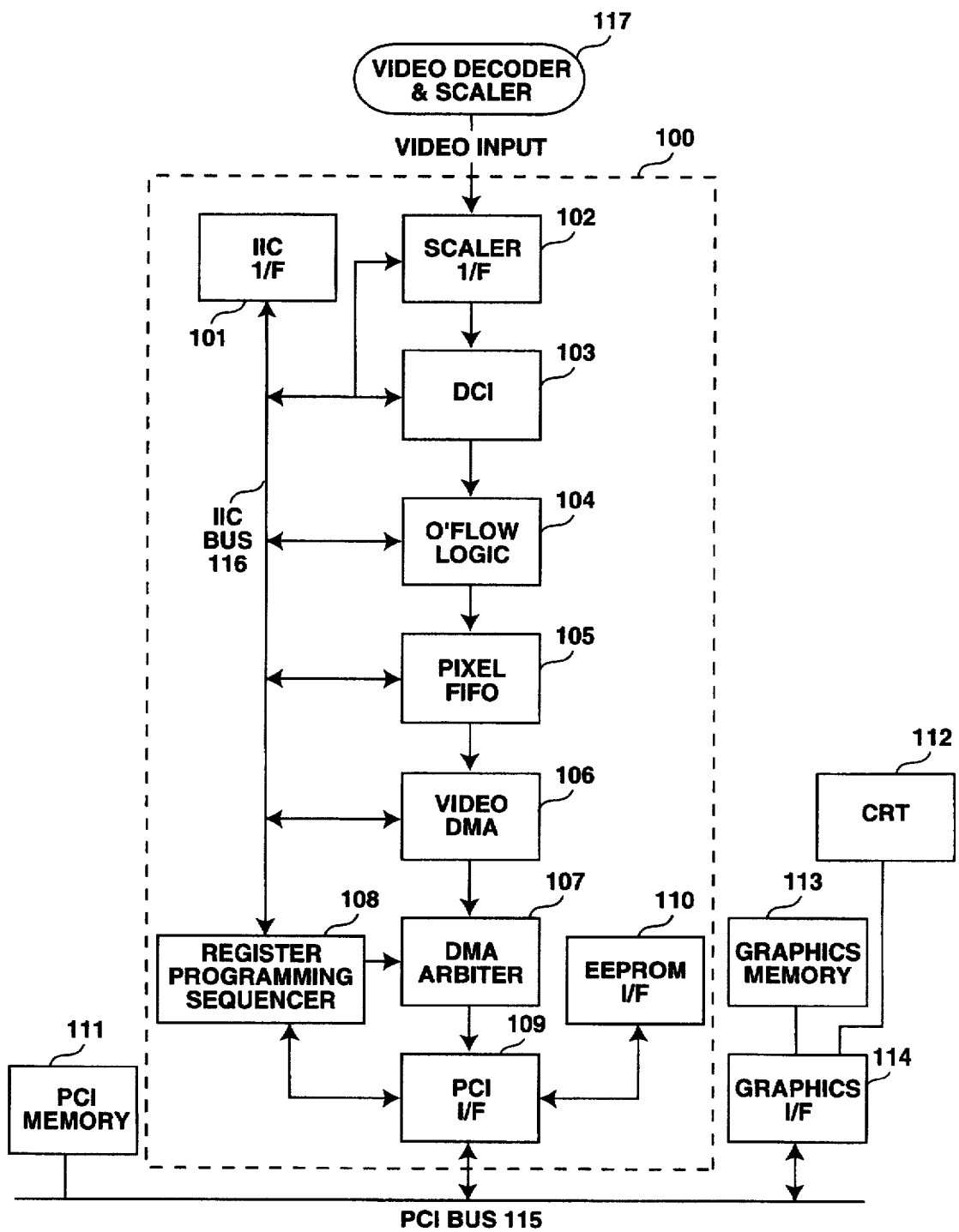
FIG. 4 is a block diagram of an embodiment of the present invention.

In the preferred embodiment, the present invention is embodied in a complementary metal oxide semiconductor (CMOS) integrated circuit (IC). With reference to FIG. 4, an embodiment of the present invention (100) serves as the interface between a National Television Standards Committee (NTSC)/Phase Alternation Line (PAL)/SECAM digital video decoder/scaler 117 and a Peripheral Component Interconnect (PCI) local bus 115 of a personal computer (PC). An embodiment of the present invention provides an inter-integrated circuit (IIC) interface 101 to program the digital video decoder/scaler 117. The present invention further comprises a first-in, first-out (FIFO) memory 105 to separate the components of the incoming video signal and buffer incoming video data, and direct memory access (DMA) channels (in video DMA controller 106) to deliver the incoming video data into packed pixel format or planar bit maps to any location in PCI memory 111 as a PCI bus master. A Register Programming Sequencer (RPS) 108 handles asynchronous, time critical scheduling of registers internal to the embodiment of the present invention 100. An embodiment of the present invention may operate as both a PCI bus master and PCI bus target. Further information regarding the function and operation of PCI local bus may be obtained from the PCI LOCAL BUS specification, revision 2.1, June, 1995.

The present invention may accept sixteen bit per pixel red-green-blue (RGB16) input, twenty four bit per pixel RGB (RGB24) input, or International Radio Consultative Committee recommendation 601 (CCIR-601) compatible video input. The CCIR-601 format is 16 bits per pixel (bpp) YUV, wherein one UV sample exists for two Y samples. YUV is the color space used in Phase Alternation Line (PAL) color systems used primarily in Europe. The Y is the luminance component; the U and V are the color components. The present invention accepts one 16 bit or one 24 bit pixel per clock cycle. YUV video data is always 16 bits per pixel (bpp), while RGB video data may be either 16 or 24 bpp.

Though there is no filtering or scaling of the incoming video data in an embodiment of the present invention, there is a means for decimating the UV data to deliver YUV12, (i.e., one UV sample for a 2 by 2 Y region), and YUV8 (monochrome). There is also a means for filtering adjacent chrominance samples.

In the preferred embodiment, the present invention interfaces with a Philips Semiconductors SAA7196 digital video decoder, scaler, and clock generator (video decoder/scaler 117 in FIG. 4), although it is understood by those of ordinary skill in the art that other decoders/scalers may be utilized. Further information on the Philips Semiconductors SAA7196 device may be obtained from the Philips Semiconductors *Desktop Video Data Handbook*, published April, 1994. The inter-integrated circuit (IIC) interface 101 of the present invention provides for programming the digital video decoder/scaler 117.

As earlier stated, the present invention interfaces with a Peripheral Component Interconnect (PCI) bus as a PCI bus master and as a PCI bus target. The present invention further comprises a set of registers, divided into two categories: 1) PCI configuration registers; and, 2) video capture registers. In the preferred embodiment, the registers are decoded and accessed as PCI targets. A base memory address register in the PCI configuration register set determines where the video capture registers are located in PCI memory space. Accesses to the video capture registers may be via reads/writes by a host (not shown in FIG. 4) coupled to the PCI bus 115, or by building a list of register addresses and contents in PCI memory 111 that the register programming sequencer (RPS) 108 can process. PCI memory 111 may be comprised of, for example, dynamic random access memory (DRAM).

After initialization and during active capturing of the incoming video signal, direct memory access (DMA) controller 106 requests the PCI bus 115 and, after acquiring the bus, will perform burst writes of video data to the PCI memory 111. Overflow block 104 provides for graceful overflow of the incoming video signal, and source clipping of the input video data (i.e., overflow block 104 performs the actual discarding of the obscured portion of a video image, but only as directed by the DCI block 103). The overflow block 104 is utilized when excessive PCI bus latency is encountered. The overflow block 104 allows for the most recently received pixels to be discarded (i.e., not entered into pixel FIFO 105) and DMA counters associated with video DMA controller 106 to be incremented at the appropriate time, i.e., when data is received from the pixel FIFO. In so doing, the overflow block 104 essentially creates gaps or holes in the video bit map.

Display control interface (DCI) block 103 allows the holes in the bit map to be inserted into the bit map under programmatic control in order to allow occlusion in the frame buffer when using source clipping to directly deliver bit maps to the graphics memory 113.

Logic and Nomenclature Conventions

The '#' symbol at the end of a signal name indicates an active, or asserted, state occurs when the signal is at a low level voltage. When no '#' is present after the signal name, the signal is active when at a high voltage level. This definition is applicable to the external signals provided by an embodiment of the present invention.

DETAILED DESCRIPTION OF AN EMBODIMENT OF THE PRESENT INVENTION

Scaler Interface Block 102

Overview

In the preferred embodiment, the scaler interface block 102 accepts incoming video data 16 or 24 bits at a time from a Philips SAA7196 digital video decoder/scaler 117. The scaler interface block 102 can generate either planar or packed pixel bit maps. When pixel FIFO 105 stores packed pixel data, it operates as a single monolithic FIFO for the video data (although portions of the FIFO may be used for source clipping operations). When the pixel FIFO 105 stores planar data, it is partitioned into three separate FIFOs, one FIFO each for Y, U, and V data.

The scaler interface block 102 comprises control logic that may decimate incoming UV data to provide 12 bpp, 9 bpp and 8 bpp (monochrome) formats. To generate 12 bpp format, only every other line of UV data is loaded into the pixel FIFO 105. To generate the 9 bpp format, every other sample of every fourth line of UV data is loaded into pixel FIFO 105. To generate 8 bpp format, none of the UV data is stored. In every case, every Y sample from the video decoder/scaler 117 is loaded into the pixel FIFO 105.

Independent of the decimation means, a horizontal averager is available for the U and V video data inputs. When the horizontal averager is enabled, every UV sample is averaged with the following UV sample.

When in planar mode, a read operation on a pixel FIFO 105 partition, e.g., Y pixel FIFO, happens independently of the read operations on the other partitions and is driven by a request from video DMA controller 106. Status bits indicate FIFO overflow (i.e., a corrupted frame).

The partitions of the pixel FIFO 105 for Y, U, and V data is programmable. In one embodiment, The FIFO is 512 bytes in length, structured as 128×36 bits (32 bits of data plus a 4 byte enable). Data is written into a 32 bit assembly buffer at 8 bits per transfer, and the assembly buffer is written into the pixel FIFOs when full, except at the beginning or end of a line, where a partial double word (dword) may be loaded. Read operations from the Y, U and V FIFO partitions are 32 bits per transfer.

The initialization of the scaler interface block 102 involves the selection of planar versus packed pixel mode, the 16, 12, 9, or 8 bpp delivery format for planar mode, or 24 or 16 bpp for packed pixel mode, and the selection of the input horizontal averaging for the UV data.

Additional logic in the scaler interface block 102 also provides for even/odd field tracking. If a sequence of multiple, same type fields are detected (i.e., even, even, even), then the sequence of fields presented to subsequent logic in the present invention will be changed to emulate a normal field progression (i.e., even, odd, even).

Figure 5:
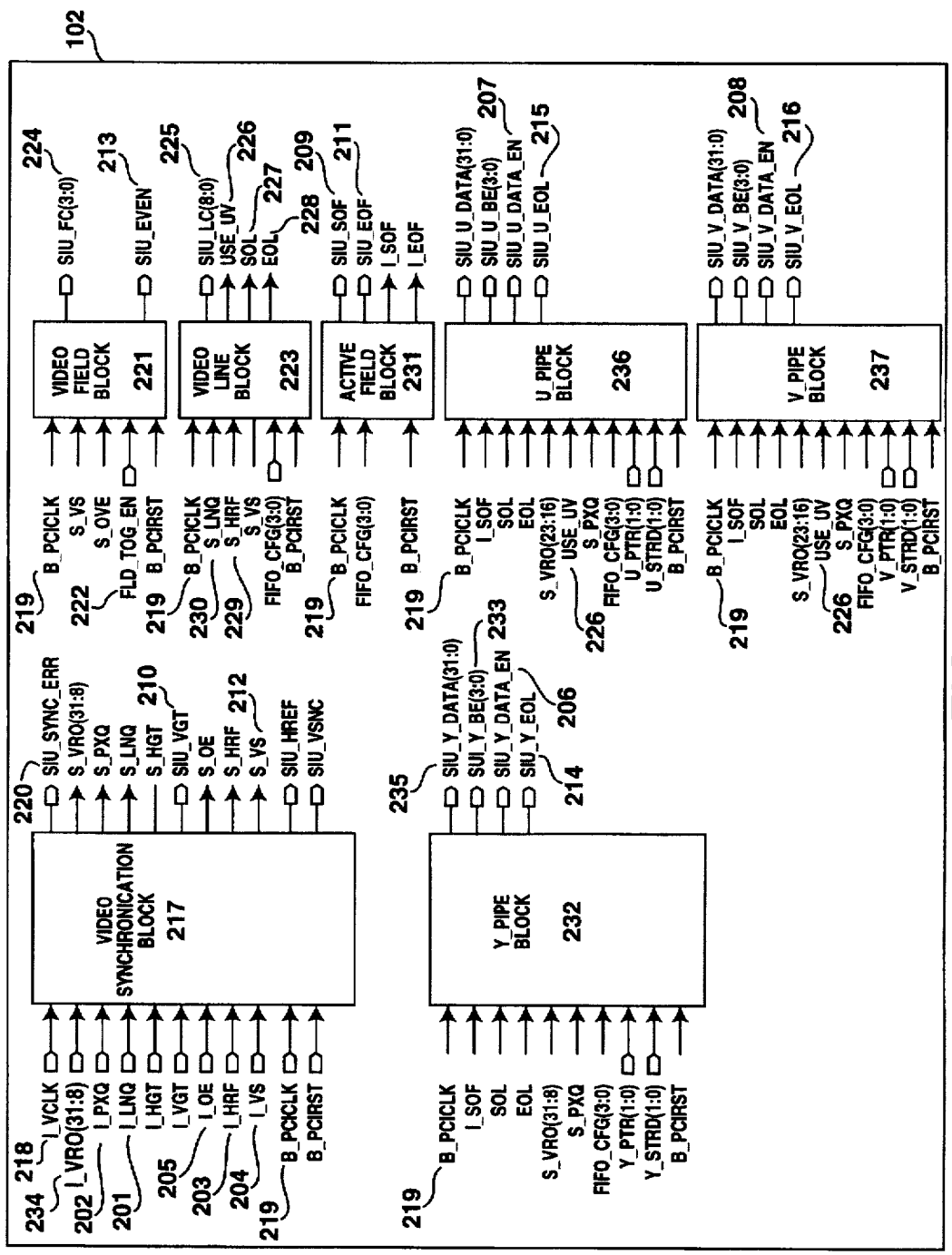
FIG. 5 is a block diagram of an embodiment of the scaler interface block 102 of FIG. 4.

With reference to FIG. 5, the preferred embodiment of the present invention couples scaler interface 102 to a Philips SSA7196 or equivalent interface operating in transparent data transfer mode. Transparent data transfer mode uses I_LNQ 201 (Line Qualifier) and I_PXQ 202 (Pixel Qualifier) status bits to determine valid pixels. The I_HRF 203 (Horizontal Reference) status bit determines the beginning and end of a line. The I_VS 204 (Vertical Sync) signal determines the beginning and end of a field. The falling edge of I_VS 204 samples the I_OE 205 (Odd/Even) status bit.

The scaler interface block 102 has three data pipe channels (Y, U, V). The Y pipe is connected to the display control interface (DCI) block 103. The U and V pipes are connected to the U and V overflow logic blocks respectively in overflow logic block 104. In YUV modes, video data is transferred through pipes Y, U and V. In RGB mode, only the Y pipe is active. For each of the three pipes, the scaler interface block 102 supplies a 32-bit data double word (dword) that is valid when a respective DATA_EN signal is active (IU_Y_DATA_EN signal 206, IU_U_DATA_EN signal 207, IU_V_DATA_EN signal 208). The dword has a four byte enable associated with it.

The scaler interface block 102 asserts a SIU_SOF signal 209 for one clock cycle at the start of an active window (SIU_VGT signal 210 rising). It asserts a SIU_EOF signal 211 for one clock cycle at the end of an active window (SIU_VGT signal 210 falling). The SIU_SOF signal 209 is used by the register programming sequencer (RPS) 108 to validate that register updates are complete. The SIU_EOF signal 211 is used by the pixel FIFO 105 to start a flush of all the FIFO partitions. A synchronized vertical sync (S_VS) signal 212 along with a SIU_EVEN signal 213 is used by the RPS 108 to ready the RPS 108 for the next field.

The scaler interface block 102 asserts a SIU_Y_EOL signal 214 for one clock cycle at the end of each active horizontal line that contains active Y data. The scaler interface block 102 asserts a SIU_U_EOL signal 215 for one clock cycle at the end of each horizontal line that contains active U data. Finally, the scaler interface block 102 asserts the SIU_V_EOL signal 216 for one clock cycle at the end of each horizontal line that contains active V data.

The DATA_EN, SIU_(Y,U,V)_EOL as a group, and SIU_SOF signals are mutually exclusive. The SIU_Y_EOL, SIU_U_EOL, SIU_V_EOL signals are not necessarily mutually exclusive.

Internal Control Logic Signals

The following table describes the internally generated control signals utilized within the scaler interface block 102.

| Signal Name | Description |
|---|---|
| S_VRO(31:8) | Synchronized Video Data Bus - Video Data synchronized to the PCICLK. |
| S_PXQ | Synchronized Pixel Qualifier - Video Pixel Qualifier synchronized to the PCICLK. |
| S_LNQ | Synchronized Line Qualifier - Video Line Qualifier synchronized to the PCICLK. |
| S_HGT | Synchronized Horizontal Gate - Video Horizontal Gate synchronized to the PCICLK. |
| S_VGT | Synchronized Vertical Gate - Video Vertical Gate synchronized to the PCICLK. |
| S_O/E | Synchronized Odd/Even(not) - Video Odd/Even(not) synchronized to the PCICLK. |
| S_HRF | Synchronized Video Horizontal Reference - Video Horizontal Reference synchronized to the PCICLK. |
| S_VS | Synchronized Vertical Sync - Video Vertical Sync. synchronized to the PCICLK. |
| USE_UV | Use UV Chrominance Data - Signal that indicates that Chrominance data should be captured on this line. |
| SOL | Start of Line - Signal that pulses at the start of a line. Derived from S_HRF. |
| EOL | End of Line - Signal that pulses at the end of a line. Derived from S_HRF. |
| L_SOF | Internal Start of Field - Internally buffered copy of SOF. Signal pulses at the start of active window of a field. Derived from SIU_VGT. |
| L_EOF | Internal End of Field - Internally buffered copy of EOF. Signal pulses at the end of active window of a field. Derived from SIU_VGT. |

With reference to FIG. 5, a video synchronization block 217 synchronizes all I_VCLK based signals 218 to a B_PCICLK signal 219. All signals exiting the video synchronization block 217 are also synchronized to the B_PCICLK signal 219. Video synchronization block 217 also detects synchronization failures in terms of lost data and asserts a SIU_SYNC_ERR signal 220 whenever data is lost.

The video synchronization block 217 implements two clock counters. One such counter is incremented on each I_VCLK signal 218 and the other counter is incremented on each detection of a synchronized I_VCLK signal 218. The value of the I_VCLK signal 218-based counter is passed through the video synchronization block 217 along with the video data. This value is compared with the value of the second counter and if a difference is detected a SIU_SYNC_ERR signal 220 is asserted. The SIU_SYNC_ERR signal 220 is reset at the falling edge of S_VS signal 212.

A video field block 221 generates a 4 bit field count 224 and also generates the SIU_EVEN signal 213. The field count is incremented at the rising edge of the S_VS signal 212. The SIU_EVEN signal 213 tracks the even/odd fields. If a sequence of multiple, same type fields is detected (i.e. even, even, even) and a FLD_TOG_EN signal 222 is asserted, then the sequence of fields presented to subsequent logic is changed to emulate a normal field progression (i.e. even, odd, even).

A video line block 223 generates a 9 bit line count 225, a USE_UV signal 226, a SOL signal 227, and an EOL signal 228. The line count 225 is incremented at the falling edge of a S_HRF signal 229. The line count 225 is reset at the rising edge of the S_VS signal 212.

The USE_UV signal 226 is active whenever chrominance data should be captured. For YUV16 video data input, chrominance is active for every active video line. For YUV12 video data input, chrominance is active for every 1 of 2 active video lines. For YUV8 video data input, chrominance is active for every 1 of 4 active video lines. The present invention utilizes the second line of 4 as the active line. For YUV8, RGB16, or RGB24 modes, chrominance is disabled.

A SOL signal 227 pulses at the beginning of each active video line. If a S_LNQ signal 230 is asserted at the rising edge of S_HRF signal 229, the line will be active.

The EOL signal 228 pulses at the end of each active video line. EOL signal 228 is pulsed at the falling edge of S_HRF 229 for each line that has an accompanying SOL signal 227.

An active field block 231 generates a start of field (SIU_SOF) signal 209 and an end of field (SIU_EOF) signal 211. These signals are pulsed for one clock cycle at the falling and rising edge of SIU_VGT signal 210, respectively.

Byte Alignment of Video Data

Byte alignment of video data can be separated into three areas:

1) byte adjustment at the start of a video line;
2) byte adjustment at the end of a video line; and,
3) stride adjustment from the end of one line to the beginning of the next line.

Byte Adjustment at the Start of a Video Line

A Y_Pipe block 232 builds up dwords of data (Y or RGB) to send to the DCI block 103. When a dword is ready, the SIU_Y_DATA_EN signal 206 is pulsed for one clock cycle to indicate to the DCI block 103 it must latch the data. A valid byte enables (SIU_Y_BE(3:0)) signal 233 is driven at the same time. SIU_Y_EOL signal 214 is pulsed for one clock cycle after the last bit of data has been sent to the DCI block 103.

In YUV16, YUV12, and YUV8 modes, a byte of luminance data is captured from the I_VRO(31:24) pins 234 each time a valid pixel in an active line is detected. If the line is dword aligned, the following mapping occurs:

| First Pixel | -> SIU_Y_DATA(7:0) |
|---|---|
| Second Pixel | -> SIU_Y_DATA(15:8) |
| Third Pixel | -> SIU_Y_DATA(23:16) |
| Fourth Pixel | -> SIU_Y_DATA(31:24) |
| etc. | |

If the line is offset by a byte, the following mapping occurs:

| | |
|---|---|
| SIU_Y_BE(0) | –>' 0' |
| First Pixel | –> SIU_Y_DATA(15:8) |
| Second Pixel | –> SIU_Y_DATA(23:16) |
| Third Pixel | –> SIU_Y_DATA(31:24) |
| etc. | |

If the line is offset by 2 bytes, the following mapping occurs:

| | |
|---|---|
| SIU_Y_BE(0) | –>' 0' |
| SIU_Y_BE(1) | –>' 0' |
| First Pixel | –> SIU_Y_DATA(23:16) |
| Second Pixel | –> SIU_Y_DATA(31:24) |
| etc. | |

Finally, if the line is offset by 3 bytes, the following mapping occurs:

| | |
|---|---|
| SIU_Y_BE(0) | –>' 0' |
| SIU_Y_BE(1) | –>' 0' |
| SIU_Y_BE(2) | –>' 0' |
| First Pixel | –> SIU_Y_DATA(31:24) |
| etc. | |

In RGB16 mode, a word of RGB data is captured from the I_VRO(31:16) pins each time a valid pixel in an active line is detected. If the line is dword aligned, the following mapping occurs:

| | |
|---|---|
| First Pixel | –> SIU_Y_DATA(15:0) |
| Second Pixel | –> SIU_Y_DATA(31:16) |
| etc. | |

If the line is offset by a word, the following mapping occurs:

| | |
|---|---|
| SIU_Y_BE(0) | –> 0' |
| SIU_Y_BE(1) | –> 0' |
| First Pixel | –> SIU_Y_DATA(31:16) |
| etc. | |

In RGB24 mode, 24 bits of RGB data is captured from the I_VRO(31:8) pins 234 each time a valid pixel in an active line is detected. This data is routed such that I_VRO(31:8) pins 234 map to SIU_Y_DATA(31:8) pins 235. SIU_Y_DATA(7:0) pins are each forced to zero and the byte enable for the least significant bit is forced to zero. If pixel locations are left unfilled at the end of a line, the unused byte enables are forced to zero.

A U_Pipe block builds up dwords of U data to send to the U overflow logic blocks in overflow logic block 104. When a dword is ready, i.e., when a complete 32 bits is received, the SIU_U_DATA_EN signal 207 is pulsed for one clock cycle to indicate to the overflow block 104 that it must latch the data. Valid byte enables (SIU_U_BE(3:0)) are driven at the same time. The SIU_U_EOL signal 215 is pulsed for one clock cycle after the last bit of data has been sent to the overflow logic block. In RGB16 and RGB24 modes, the U_Pipe block is not active.

In YUV16 and YUV12 modes, a byte of chrominance data is captured from the I_VRO(23:16) pins 234 each time a valid pixel in an active line (USE_UV signal 226 asserted) is detected. If the line is dword aligned, the following mapping occurs:

| | |
|---|---|
| First Pixel | –> SIU_U_DATA(7:0) |
| Second Pixel | –> SIU_U_DATA(15:8) |
| Third Pixel | –> SIU_U_DATA(23:16) |
| Fourth Pixel | –> SIU_U_DATA(31:24) |
| etc. | |

If the line is offset by a byte, the following mapping occurs:

| | |
|---|---|
| SIU_U_BE(0) | –> '0' |
| First Pixel | –> SIU_U_DATA(15:8) |
| Second Pixel | –> SIU_U_DATA(23:16) |
| Third Pixel | –> SIU_U_DATA(31:24) |
| etc. | |

If the line is offset by 2 bytes, the following mapping occurs:

| | |
|---|---|
| SIU_U_BE(0) | –> '0' |
| SIU_U_BE(1) | –> '0' |
| First Pixel | –> SIU_U_DATA(23:16) |
| Second Pixel | –> SIU_U_DATA(31:24) |
| etc. | |

If the line is offset by 3 bytes, the following mapping occurs:

| | |
|---|---|
| SIU_U_BE(0) | –> '0' |
| SIU_U_BE(1) | –> '0' |
| SIU_U_BE(2) | –> '0' |
| First Pixel | –> SIU_U_DATA(31:24) |
| etc. | |

In YUV8 mode, only 1 of 2 pixels of chrominance data is captured. This is referred to as decimation. The first pixel in the line is discarded, the next is captured. This process is repeated until the end of the line. The captured pixels are ordered as described above.

In YUV8 mode, filtering may be enabled. This averages a pair of pixels of chrominance instead of using every other pixel. In some instances, it may be useful to divide the chrominance data by 2. In the preferred embodiment of the present invention, the U_Pipe block 236 may operate in this mode. Finally, if pixel locations are left unfilled at the end of a line, the unused byte enables are forced to zero.

A V_Pipe block 237 builds up dwords of V data to send to the V overflow logic block in overflow logic block 104. When a dword is ready, the SIU_V_DATA_EN signal 208 is pulsed for one clock cycle to indicate to the overflow logic block that it must latch the data. Valid byte enables (SIU_V_BE(3:0)) will be driven at the same time. The SIU_V_EOL signal 216 is pulsed for one clock cycle after the last bit of data has been sent to the overflow logic block 104. In RGB16 and RGB24 modes, the V_Pipe block 237 is not active.

In YUV16 and YUV12 modes, a byte of chrominance data is captured from the I_VRO(23:16) pins 234 each time a valid pixel in an active line (USE_UV signal 226 asserted) is detected. If the line is dword aligned the following mapping occurs:

| | |
|---|---|
| First Pixel | -> SIU_V_DATA(7:0) |
| Second Pixel | -> SIU_V_DATA(15:8) |
| Third Pixel | -> SIU_V_DATA(23:16) |
| Fourth Pixel | -> SIU_V_DATA(31:24) |
| etc. | |

If the line is offset by a byte, the following mapping occurs:

| | |
|---|---|
| SIU_V_BE(0) | -> '0' |
| First Pixel | -> SIU_V_DATA(15:8) |
| Second Pixel | -> SIU_V_DATA(23:16) |
| Third Pixel | -> SIU_V_DATA(31:24) |
| etc. | |

If the line is offset by 2 bytes, the following mapping occurs:

| | |
|---|---|
| SIU_V_BE(0) | -> '0' |
| SIU_V_BE(1) | -> '0' |
| First Pixel | -> SIU_V_DATA(23:16) |
| Second Pixel | -> SIU_V_DATA(31:24) |
| etc. | |

If the line is offset by 3 bytes, the following mapping occurs:

| | |
|---|---|
| SIU_V_BE(0) | -> '0' |
| SIU_V_BE(1) | -> '0' |
| SIU_V_BE(2) | -> '0' |
| First Pixel | -> SIU_V_DATA(31:24) |
| etc. | |

In YUV8 mode, 1 of 2 pixels of chrominance is captured as decimation. The first pixel in the line is discarded, the next is captured. This process is repeated until the end of the line. The captured pixels are ordered as above. In YUV8 mode, filtering may be enabled. This averages a pair of pixels of chrominance instead of using every other pixel only. In some instances, it may be useful to divide the chrominance data by 2. The V_Pipe block supports this mode. If pixel locations are left unfilled at the end of a line, the unused byte enables are forced to zero.

Byte Adjustment at the End of a Video Line

If pixel locations are left untilled at the end of a line, the unused byte enables are forced to zero. The alignment at the end of the line can be calculated by:

(beginning byte offset+number of bytes in line) modulus 4

The ending byte offset is represented by the following byte enable patterns:

If the end of the line is dword aligned, the following byte enable pattern is used:

| | |
|---|---|
| Byte Enable(0) | -> '1' |
| Byte Enable(1) | -> '1' |
| Byte Enable(2) | -> '1' |
| Byte Enable(3) | -> '1' |

If the end of the line is offset by a byte, the following byte enable pattern is used:

| | |
|---|---|
| Byte Enable(0) | -> '1' |
| Byte Enable(0) | -> '0' |
| Byte Enable(0) | -> '0' |
| Byte Enable(0) | -> '0' |

If the line is offset by 2 bytes, the following byte enable pattern is used:

| | |
|---|---|
| Byte Enable(0) | -> '1' |
| Byte Enable(0) | -> '1' |
| Byte Enable(0) | -> '0' |
| Byte Enable(0) | -> '0' |

If the line is offset by 3 bytes, the following byte enable pattern is used:

| | |
|---|---|
| Byte Enable(0) | -> '1' |
| Byte Enable(0) | -> '1' |
| Byte Enable(0) | -> '1' |
| Byte Enable(0) | -> '0' |

These patterns are sent to the stride calculation block.

Stride Adjustment from the End of One Line to the Beginning of the Next Line Stride is defined as the space left in memory from the memory location storing the end of one line of video data to the memory location storing the beginning of the next line of video data in memory. As each dword is sent to the video DMA controller 106, the memory address for the next transfer is incremented by four. If a stride of 0 is desired with an ending byte offset that is not dword aligned, two transfers to the same memory address must be done. One transfer at the end of the last line is performed and one transfer at the beginning of the current line is performed. The dword based memory address for the start of a line is calculated by:

If the byte offset at the end of line+byte based stride modulus 4≧4, then dword based address for the memory address past the last pixel in line+dword based stride, else dword based address for address past the last pixel in line+dword based stride−1

The byte offset for the beginning of a line is calculated by:

(byte offset at end of line+(byte based address modulus 4)) modulus 4.

Nonfringing RGB24 to RGB16 Conversion

In RGB mode, scaler interface block 102 receives 24 bits per pixel of video data (RGB24), wherein the red (R), green (G) and blue (B) color components of each pixel in the video signal each comprise 8 bits of data. In the preferred embodiment of the present invention, the scaler interface block 102 converts the 24 bits per pixel RGB video signal to a 16 bits per pixel RGB video signal (RGB16) prior to display of the video image on CRT 112.

Decimation may be used to convert the incoming video signal from RGB24 to RGB16. Decimation, in one form, involves simply dropping the least significant bits of each color component, e.g., the three least significant bits (LSBs) of the red, green and blue color components, for each pixel in the incoming video signal. A drawback of such a conversion technique is the appearance of contour lines on smooth shaded surfaces when the video image is displayed on the CRT 112. A form of dithering known as error diffusion may be utilized to reduce or eliminate the contour lines by adding the discarded (LSBs) of each color component of a current pixel (i.e., the most recently received pixel from the incoming video signal) to the LSBs of the same color component of a previous pixel (i.e., the second most recently received pixel from the incoming video signal), and factoring a carry out from the LSB addition to the most significant bits (MSBs) of the same color component in the next pixel to be received from the incoming video signal. This minimizes the differences in successive pixels displayed on the CRT 112, thereby minimizing the contouring effects that may occur. The error, i.e., the difference between the incoming 24 bits per pixel video image and the 16 bits per pixel image that is displayed, is thereby diffused over adjacent pixels on the display device, e.g., CRT 112.

However, as can be appreciated by a person of ordinary skill in the art, the error diffusion technique also has a drawback in that it produces a fringing effect on boundaries, particularly hard boundaries, e.g., the edge of a smooth shaded surface. The preferred embodiment of the present invention eliminates the visual artifacts caused by fringing by comparing the most significant bits (MSBs) of each color component (red, green and blue) of a current pixel in the incoming RGB24 video signal with the MSBs of the same color components in a previous pixel in the video signal. By comparing the MSBs of each color component of a current pixel with the MSBs of the same color component in a previous pixel, the present invention functions essentially as an edge detector. When an edge is detected in the video image represented by the video signal, i.e., when the comparison of the MSBs of the same color component in successive pixels is not the same or is not equal, a latch used to store the sum of the LSBs for the same color component is cleared. By clearing the latch when an edge is detected, a carry out from the addition of the LSBs of the color component in a previous and current pixel may not be added to the MSBs of the same color component in the next pixel. Diffusion is thus prevented, thereby eliminating introduction of unwanted visual artifacts in the video image displayed on CRT 112.

Figure 6:
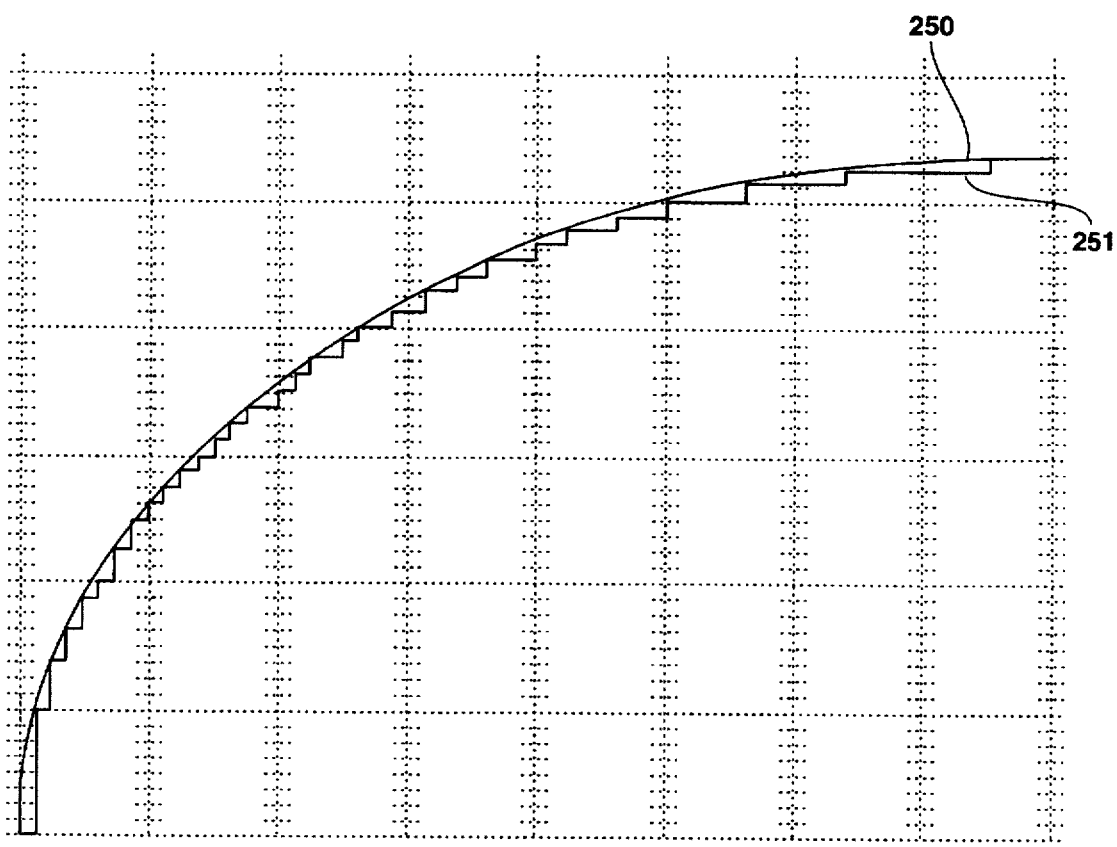
FIG. 6 illustrates a line and a quantized approximation of the line as may be achieved by an embodiment of the present invention.
Figure 7:
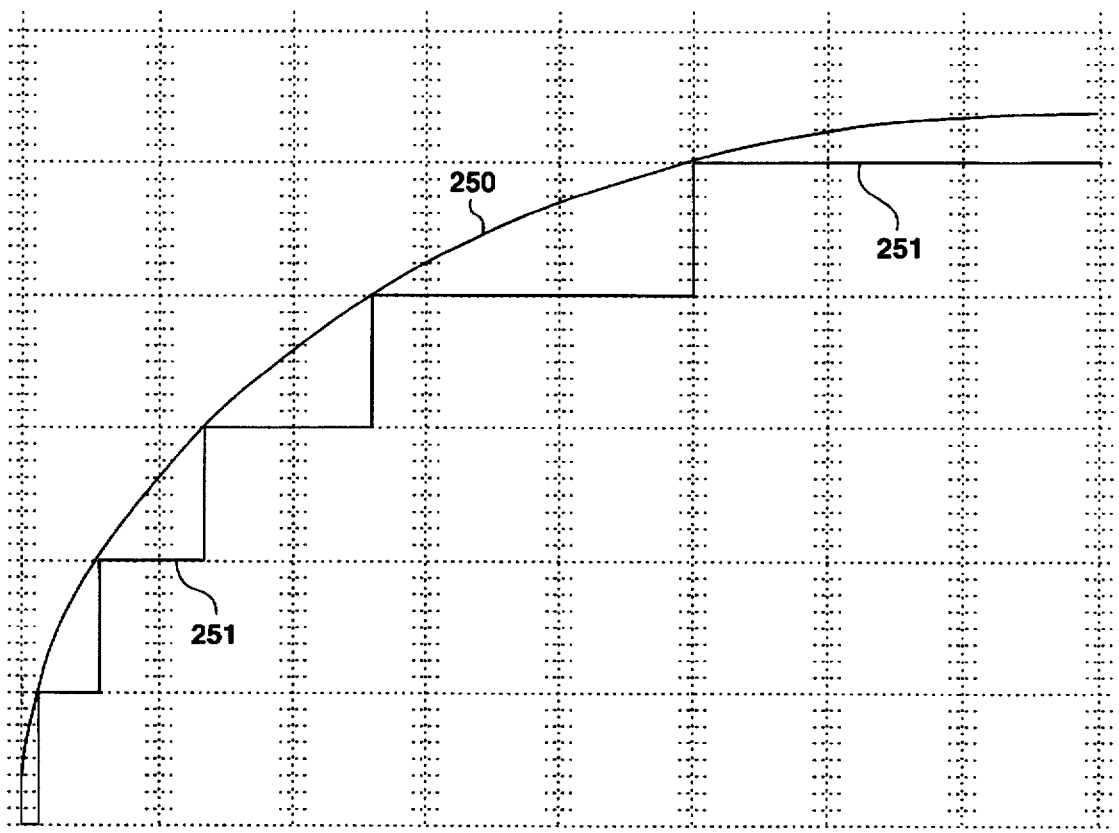
FIG. 7 illustrates a quantized approximation of a line after decimation.
Figure 8:
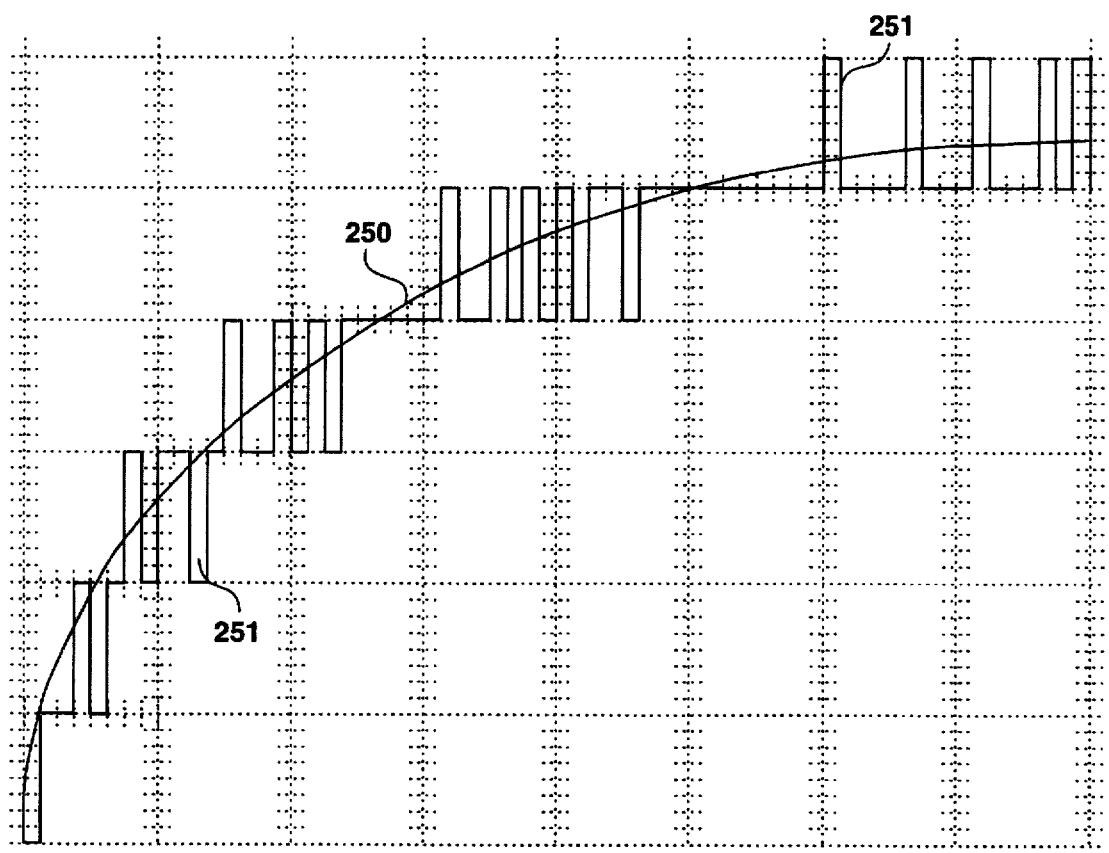
FIG. 8 illustrates a quantized approximation of a line after accumulated dithering.

FIG. 6 illustrates, for example, a desired smooth line 250, and its quantized approximation 251, on a graphics display device, e.g., CRT 112. FIG. 7 illustrates the quantized approximation 251 of the smooth line 250 after decimation, e.g., after dropping the 3 least significant bits. FIG. 8 illustrates a quantized approximation 251 of the smooth line 250 after decimation and accumulated dithering, i.e., after adding the discarded least significant bits (LSBs) of a color component in a current and previous pixel, and adding any carry out therefrom to the MSBs of the same color component in the next pixel in the incoming video signal. Visual artifacts appear in the quantized approximation 251 as a result of the decimation and dithering.

Figure 9:
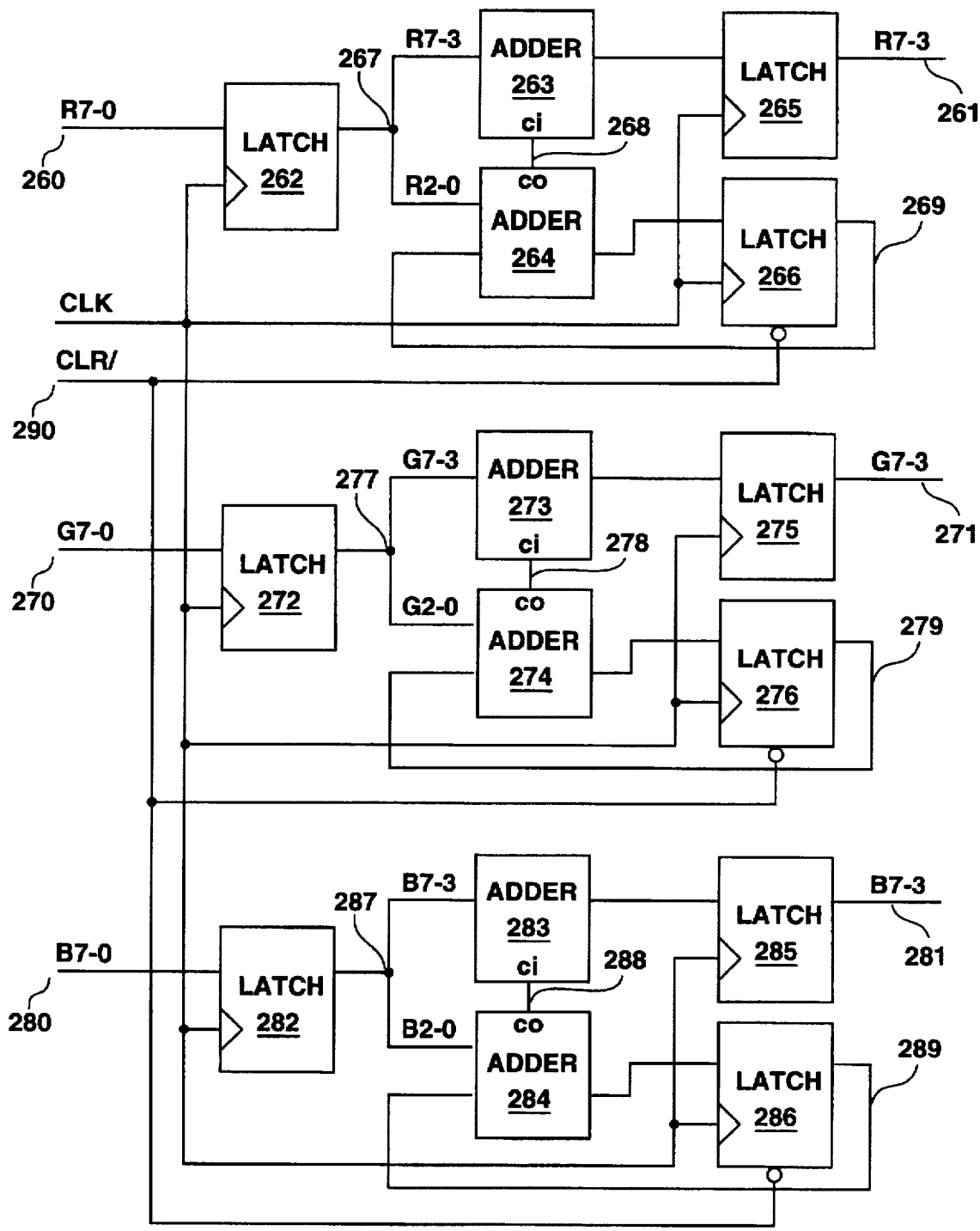
FIG. 9 is a block diagram of an embodiment of the present invention for decimating and dithering an incoming video signal.

FIG. 9 is a block diagram of the RGB24 to RGB16 conversion logic in scaler interface block 102 for performing decimation, i.e., separating the most significant bits (MSBs) and least significant bits (LSBs) of each color component, and for performing accumulated dithering. Line 260 accepts as input 8 bits representing the red color component of a 24 bit pixel in an RGB24 video signal. Lines 270 and 280 likewise accept as input 8 bits respectively representing the green and blue color components of the 24 bit pixel. The red, green and blue color components are buffered at latches 262, 272, and 282, respectively. The 5 most significant bits of each color component are separated from the 3 least significant bits at points 267, 277 and 287. This accomplishes decimation (and produces an alpha 5-5-5 format of RGB16). Adder 263 accepts the MSBs of the red color component, while adder 264 accepts the LSBs of the red color component. Likewise, adders 273 and 274 accept the MSBs and LSBs of the green color component, while adders 283 and 284 respectively accept the MSBs and LSBs of the blue color component.

Adders 264, 274 and 284 each have a carry out pin that is respectively coupled to a carry in pin on adders 263, 273 and 283 via lines 268, 278 and 288. The LSBs of each color component of a current pixel are added to the accumulated LSBs of the same color component of previous pixels stored in latches 266, 276 and 286 and input to adders 264, 274 and 284 via lines 269, 279 and 289, respectively. Thus, in accordance with the error diffusion technique described above, if there is a carry out from the addition of the accumulated LSBs of a color component, it is added to the MSBs of the same color component in the next pixel. Each adder 263, 273 and 283 has circuitry (not shown) that prevents the sum of the MSBs from rolling over to zero when the MSBs are all ones and there is a carry in from the adders for the LSBs.

Figure 10:
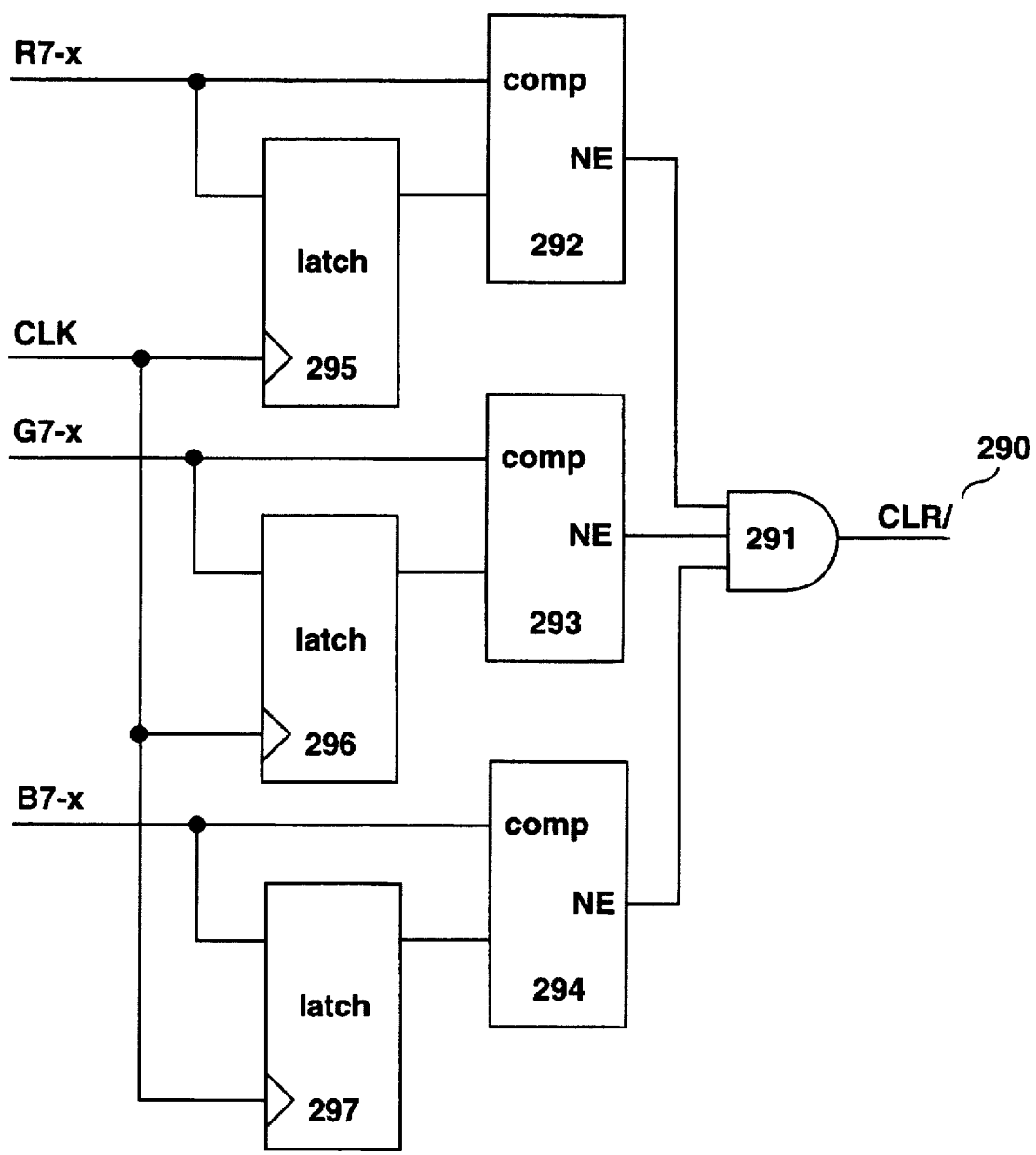
FIG. 10 is a block diagram of a edge detector circuit as may be embodiment by the present invention to prevent unwanted visual artifacts from appearing in a video image displayed on graphics display device coupled to a host.

FIG. 10 illustrates a block diagram of the edge detection circuit for preventing visual artifacts from appearing in the RGB16 video image displayed on CRT 112. A programmable number of MSBs for each color component of a pixel is stored in latches 295, 296 and 297. The same number of MSBs for each color component of a next pixel is compared with the MSBs for the same color component of the pixel stored in latches 295, 296 and 297 by comparators 292, 293 and 294, respectively. When the MSBs for each color component of the next pixel do not compare with the MSBs for each color component of the stored pixels i.e., the MSB values are not the same, i.e., are not equal, then the output of an AND gate 291 having inputs coupled to each comparator is true. The output of AND gate 291 is coupled to clear (CLR) signal 290, which is asserted when the output of AND gate 291 is true, thereby resetting the accumulated LSBs for each color component stored in latches 266, 276 and 286. Resetting the latches prevents dithering at an edge or boundary of the video image to be displayed on CRT 112.

Display Control Interface (DCI) Block 103

Overview

The display control interface (DCI) block 103 handles the tasks associated with clipping regions of video data before the video data is stored in a frame buffer such as graphics memory 113 coupled to graphics interface 114. When the DCI block 103 transfers video images directly to a frame buffer, parts of the video image may be occluded by overlaid windows. Therefore, a means for source clipping the obscured portions of the video image is needed. Source clipping is used in connection with packed pixel bit maps, and is intended for use when the destination of the bit map is a graphics device such as cathode ray tube (CRT) 112.

The DCI block 103, in one embodiment, allows up to 15 clipped segments on any scan line. Clipping segments may change on every scan line, or may be the same for any number of contiguous scan lines.

Figure 11:
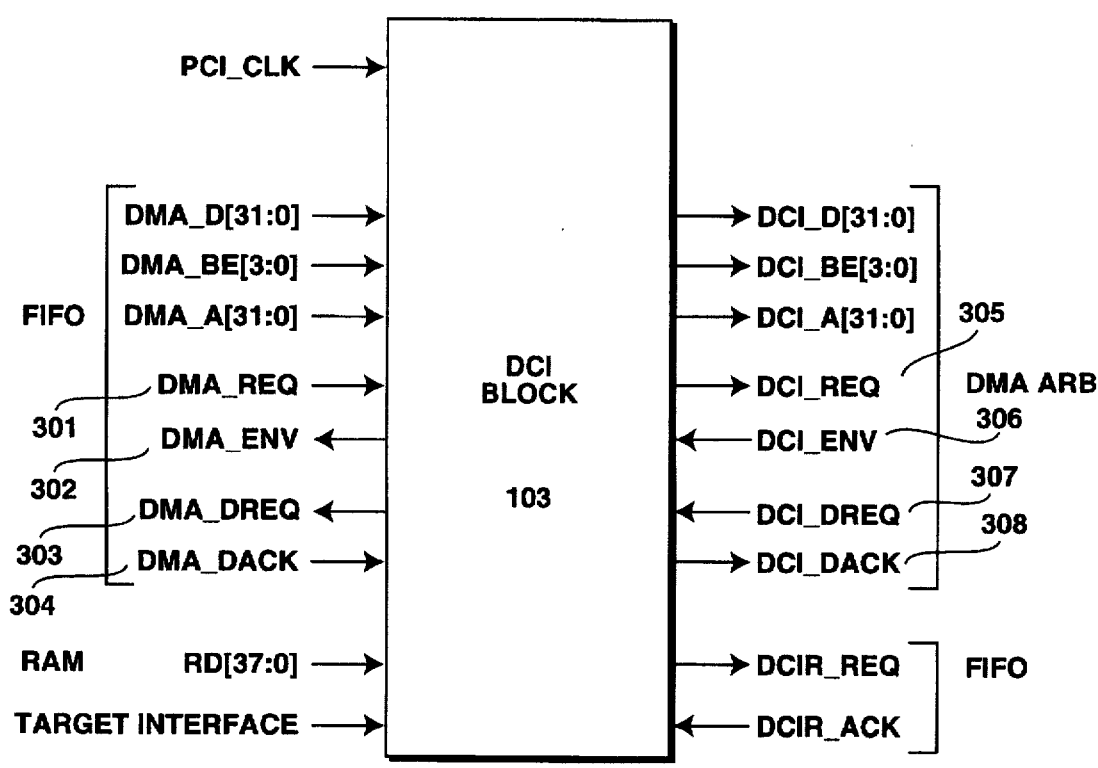
FIG. 11 illustrates input and output signals in connection with the DCI block 103 of FIG. 4.

With reference to FIG. 11, a DMA request (DMA_REQ) signal 301 is asserted by the video DMA controller 106 to request that the DCI block 103 initiate a read of data from PCI memory 111. If the DMA_REQ signal is subsequently deasserted, no more data is available and the read is terminated. In response, the DCI block 103 will assert a DMA_ENV signal 302 for the duration of the read. If the DCI block 103 senses that a PCI burst transfer has been terminated, it will deassert the DMA_ENV signal 302. A DMA_DREQ signal 303 is asserted by the DCI block to indicate that it is ready to receive a dword of data. When the video DMA controller 106 has valid address, data and byte enables ready, it will respond with a DMA_DACK signal 304.

A display control interface request (DCI_REQ) signal 305 is asserted by the DCI Block 103 to request that a DMA arbiter block 107 initiate a read of data. If the DCI_REQ signal 305 is subsequently deasserted, no more data is available and the read burst is terminated. In response to the DCI_REQ signal 305 assertion, the DMA arbiter block 107 will assert the DCI_ENV signal 302 for the duration of the burst. If the DMA arbiter block 107 senses that a PCI burst transfer has been terminated, it will deassert the DCI_ENV signal 306.

The DCI_DREQ signal 307 is asserted by the DMA arbiter block 107 to indicate that it is ready to receive a dword of data. When the DCI block 103 has valid address, data and byte enables ready, it will respond a DCI_DACK signal 308.

Operation

In the preferred embodiment of the present invention, the source clipping function performed by the DCI block 103 is controlled by a software routine. For example, in a personal computer running a window based operating system, a window manager notifies the software routine that the windows list has changed, or notifies the software routine that the video image being delivered directly to the graphics device, e.g., CRT 112, is obscured by another window. The software routine must then analyze the windows list and decide where the video image is obscured from view. If the video image is covered, the software routine creates a list of strips and tiles that describe the covered regions of the video image. The list may be in the form of a linked list in PCI memory 111. Coordinates of these strips and tiles may be specified in scanline and pixel dimensions (respectively) with the (0,0) reference being at the top left of the captured video image.

In connection with the source clipping function performed by the DCI block 103, a clipping segment is any number of contiguous pixels on a scan line that are clipped. A strip is any number of contiguous scan lines that have the same clipping segment(s) on each scan line. A tile is a rectangular region to be clipped; the top and bottom boundaries of the tile are defined by a strip, whereas the left and right boundaries of the tile are defined by a clipping segment. Finally, a clipping list, or simply, clip list, is built in PCI memory 111 and is processed during the active portion of the capture process. The clip list is made up of at least one strip descriptor (dword in length) followed by from at least one to 15 tile descriptors. A clip list is ordered with the strips from top to bottom, and within the strips, tiles are ordered from left to right. The format of the strip and tile descriptors are as follows:

| Strip descriptor | | | | | |
|---|---|---|---|---|---|
| D31:28 | D27 | D26:25 | D24:16 | D15:9 | D8:0 |
| # of tiles | LS* | Reserved | Strip Start | Reserved | Strip End |
| Tile descriptor | | | | | |
| D31:26 | | D25:16 | D15:10 | | D9:0 |
| Reserved | | Tile Start | Reserved | | Tile Length |

*LS = Last Strip bit. Set this bit in the last strip of the field.

When the DCI block 103 is enabled, it begins fetching strip and tile descriptors from the clip list in PCI memory 111. In the preferred embodiment, there are two strip descriptor registers in DCI block 103. One strip descriptor register holds strip n, while the other strip descriptor register holds strip n+1. The tile information for these two strips are loaded into the U and V pixel FIFO partitions in pixel FIFO 105. It should be noted the FIFOs are allocated when a FIFO configuration is selected with DCI enabled.

A line counter invokes the source clipping function when the video capture is in the range of a strip. Tile start information is transferred from the pixel FIFO to a comparator. Tile length information is transferred to a counter. Clipping for the first tile begins when the comparator determines the pixel count matches the tile start, and continues for the tile length. At this point, the next tile descriptor is read from the pixel FIFO, and the process continues in this manner until the end of the line is reached. If the next line is in the same strip, the pixel FIFO is read again for the tile information. If the next line is in the next strip, then the other strip descriptor register and accompanying pixel FIFO is used. The register programming sequencer (RPS) 108 will fetch the next set of strip/tile descriptors from PCI memory 111 and load them into the unused strip descriptor register (i.e., strip descriptor register n+1 if n is in use) and pixel FIFO partitions. This process continues through the end of the field or the last strip descriptor, whichever is occurs first.

Figure 12:
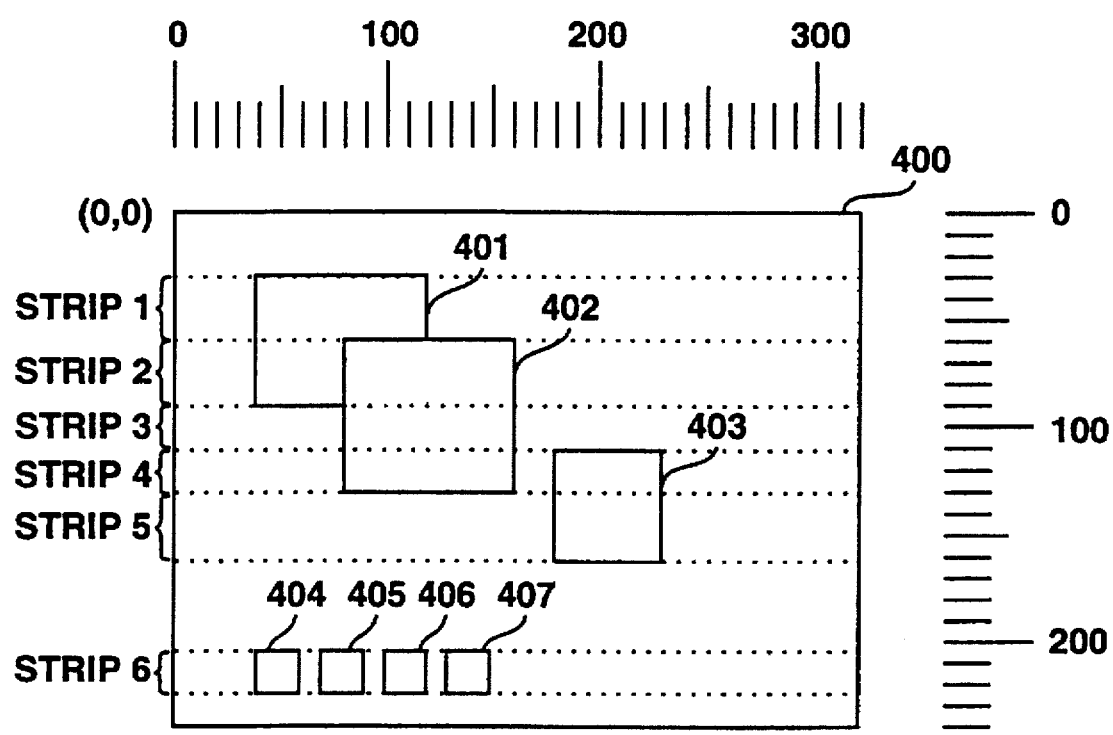
FIG. 12 illustrates strips and tiles in a video display as utilized by an embodiment of the present invention.

With reference to an example display as might appear on a graphics display device as illustrated in FIG. 12, an outside rectangular region 400 is a video window on a graphics display device such as CRT 112. The inside rectangular regions 401–407 may be overlaying windows, menus, icons, etc., that are overlaid by rectangular region 400 and are, thus, regions to be clipped. The display yields a clip list with six strips (areas of the screen that have no clipping do not define strips). Strips 1, 2, 3 and 5 only have one tile, while strip 4 has two tiles, and strip 6 has four tiles. Given the above format for the strip and tile descriptors, a clip list for the display in FIG. 12 would look like:

| | |
|---|---|
| 101E003B(h) | first strip descriptor, one tile, strip starting on line 1E(h), ending on line 3B(h). |
| 0028005A(h) | tile starting at 28(h), 50(h) pixels in length. |
| 103C0059(h) | second strip descriptor, one tile, strip starting on line 3C(h), ending on line 59(h). |
| 00280078(h) | tile starting at 28(h), 78(h) pixels in length. |
| 105A006B(h) | third strip descriptor, one tile, strip starting on line 5A(h), ending on line 6B(h). |
| 00500050(h) | tile starting at 50(h), 50(h) pixels in length. |
| 206C0081(h) | fourth strip descriptor, two tiles, strip starting on line 6C(h), ending on line 81(h). |
| 00500050(h) | tile starting at 50(h), 50(h) pixels in length. |
| 00B40032(h) | tile starting at 84(h), 32(h) pixels in length. |

-continued

| | |
|---|---|
| 1082009F(h) | fifth strip descriptor, one tile, strip starting on line 82(h), ending on line 9F(h). |
| 00B40032(h) | tile starting at 84(h), 32(h) pixels in length. |
| 48C800DB(h) | sixth strip descriptor, four tiles, strip starting on line C8(h), ending on line DB(h). |
| 00280014(h) | tile starting at 28(h), 14(h) pixels in length. |
| 00460014(h) | tile starting at 46(h), 14(h) pixels in length. |
| 00640014(h) | tile starting at 64(h), 14(h) pixels in length. |
| 00820014(h) | tile starting at 82(h), 14(h) pixels in length. |

Figure 1:
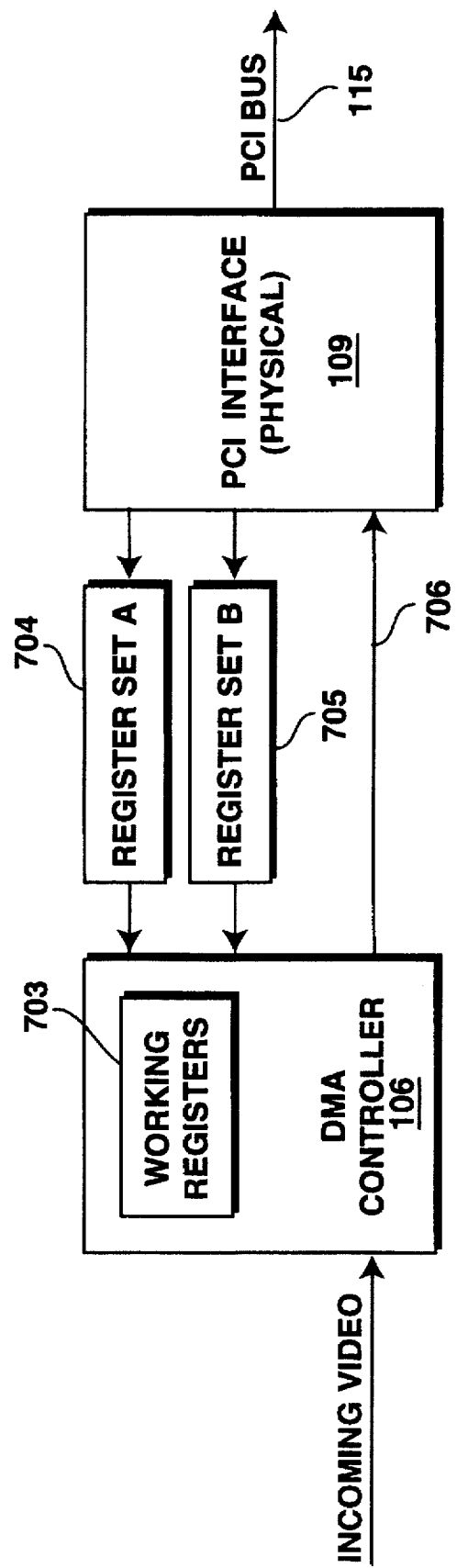
FIG. 1 is a block diagram of the prior art method and apparatus for real time delivery of video data to memory in a host.
Figure 2:
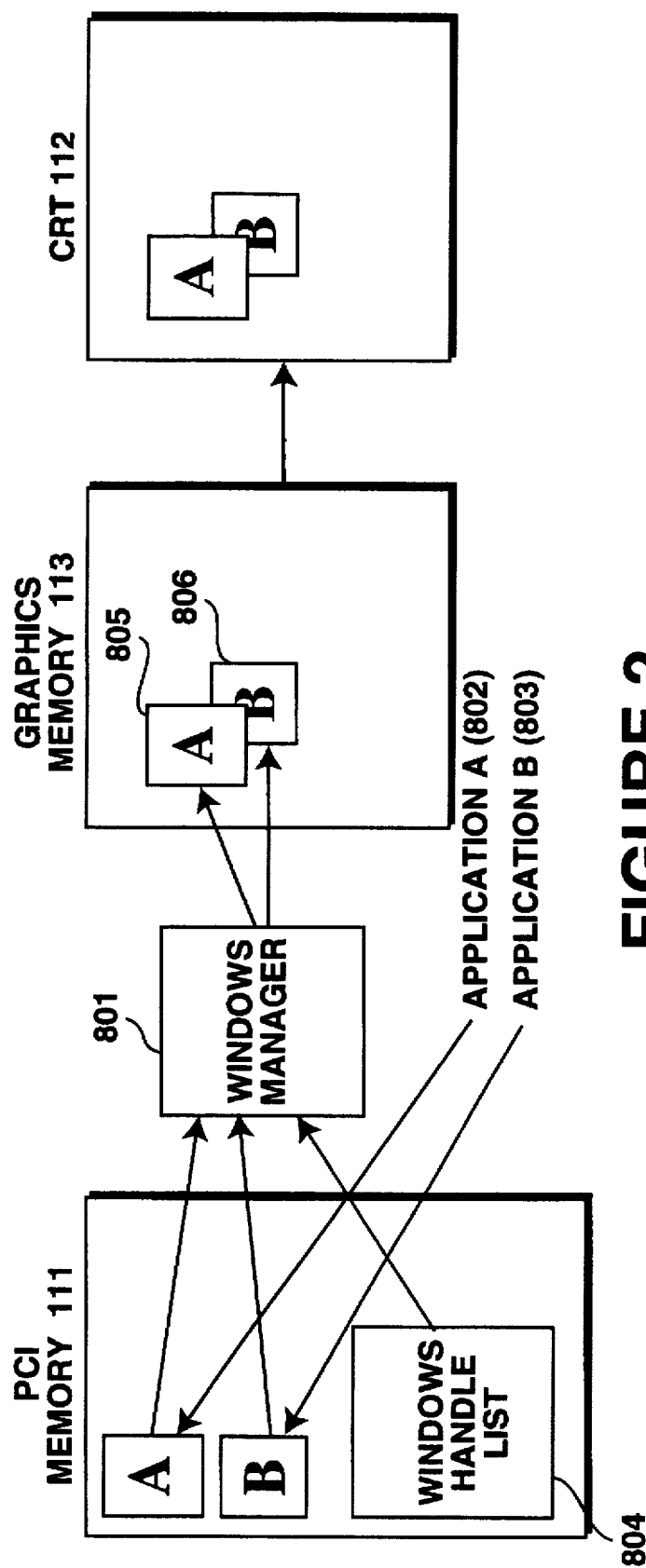
FIG. 2 is a block diagram of a prior art method of managing the display of multiple windows in a graphics display device such as CRT 112.
Figure 3:
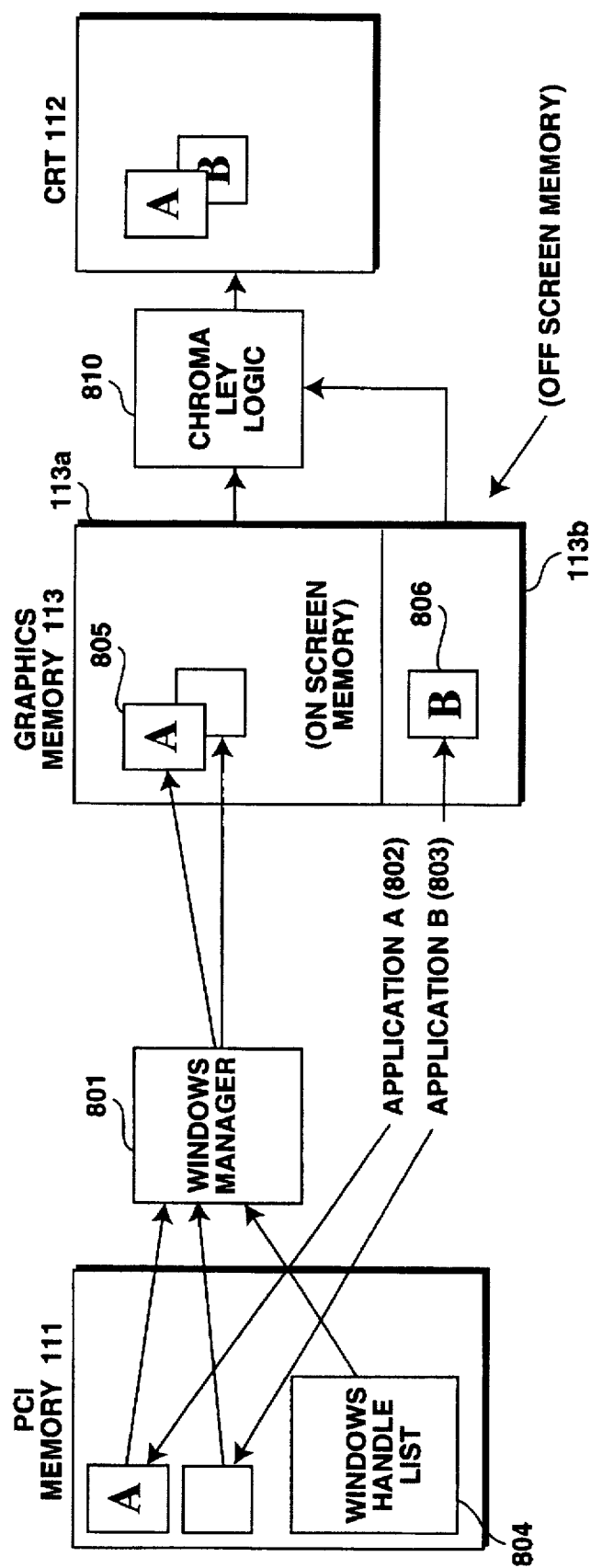
FIG. 3 is a block diagram of yet another prior art method of managing the display of multiple windows in a graphics display device such as CRT 112.
Figure 13:
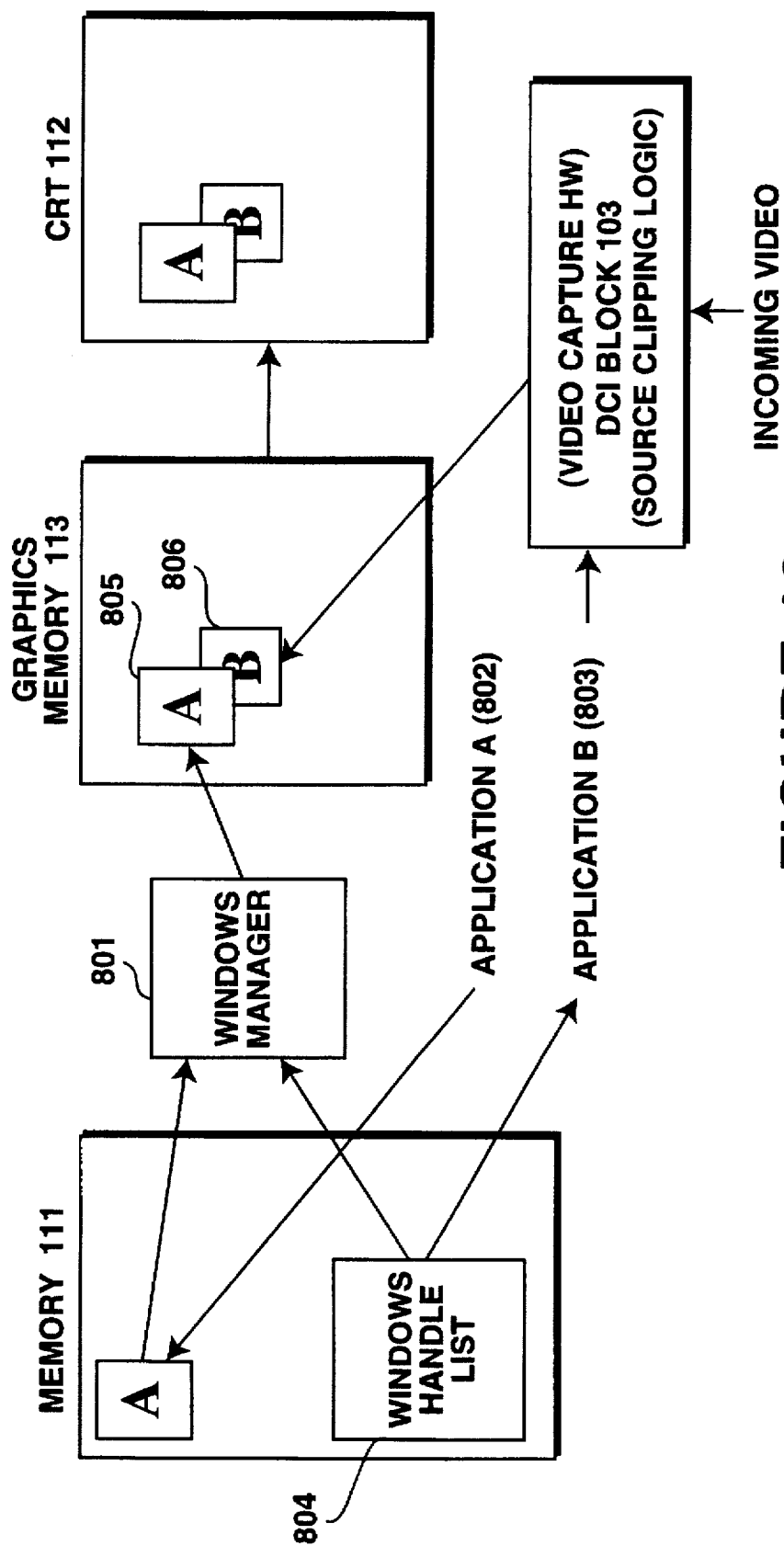
FIG. 13 is a block diagram of an embodiment of the present invention.

FIG. 13 illustrates a block diagram of the preferred embodiment of the source clipping function vis-a-vis the prior art approaches illustrated in the block diagrams of FIGS. 2 and 3 and as described above. Video capture hardware in DCI block 103 has source clipping logic. If there is any change to the windows manager 801, application B (803) is notified, and the clip list that is processed by the source clipping logic in the video capture hardware is updated if there is any change to the occlusion of a video image, i.e., video window. As video data enters the video capture hardware, its destination coordinates are compared with the regions to be clipped. If there is a match, then the data is not written to the graphics memory 113. The graphics memory contents are then scanned and displayed on the CRT 112 as described in connection with FIG. 2. Thus, offscreen memory and chroma key logic, as illustrated in FIG. 3, is not necessary in the graphics memory 113. The amount of PCI bus 115 bandwidth consumed is minimized because only the displayed pixels are actually written to graphics memory 113.

Overflow Logic Block 104

Overview

Figure 14:
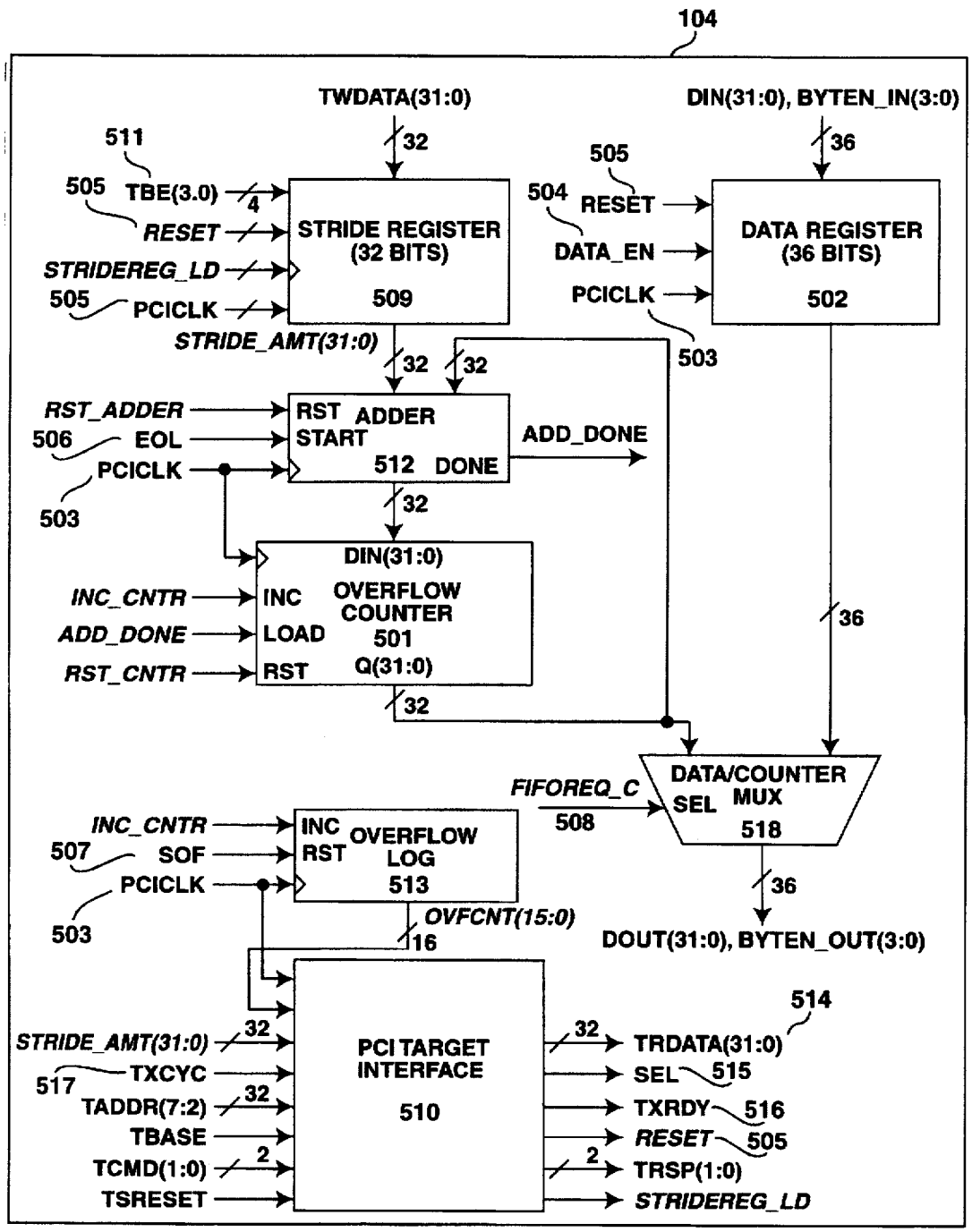
FIG. 14 is a block diagram of overflow block 104 from FIG. 4.

With reference to FIG. 14, the overflow block 104 manages the transfer of data from DCI block 103 to the pixel FIFO 105. The overflow block 104 performs one of two functions for each dword of data that it receives:

1) Load data into a data register 502, then write the data into the pixel FIFO 105.
2) Determine if the dword loaded into the data register 502 will not be written to the pixel FIFO 105 when the pixel FIFO 105 is full or the dword has been clipped by DCI block 103. A clipped dword is defined as a dword with all byte enables inactive. When the incoming dword is not written into the pixel FIFO, the overflow logic block will increment an overflow counter 501.

When the pixel FIFO 105 is not full and the incoming dword is not clipped, the overflow block 104 writes the value of the overflow counter 501 into the pixel FIFO 105. The overflow block 104 appends four inactive byte enable signals (at 511) to the count value in overflow counter 501. The video DMA controller 106 recognizes that this value should be interpreted as an address increment value rather than a dword of video data by decoding all four byte enable signals as inactive.

The overflow block 104 also handles a DMA address adjustment function defined in a stride function (described below). At the end of a horizontal line, a stride adjustment value is added to the overflow counter 501. The overflow counter accumulates the stride adjustment along with the current overflow counter value.

The value of the overflow counter 501 is written to the pixel FIFO 105 just prior to the next non-clipped dword that the pixel FIFO is ready to accept. If the pixel FIFO 105 is full when the next valid data dword arrives from the over-flow logic block 104, the overflow counter contents remain in the overflow counter 501, incrementing at the arrival of every dword from overflow block 104 until the pixel FIFO 105 is no longer full and a non-clipped dword is received.

The overflow block 104 runs synchronously to the PCICLK signal 503. It receives a RESET signal 505 that is synchronous to the PCICLK signal 503. Generally, all state machine logic, data and control logic to and from the overflow block 104 operates synchronously from the rising edge of the PCICLK signal 503.

In the preferred embodiment, there are three instances of the overflow logic block 104: the Y overflow logic block, the U overflow logic block, and the V overflow logic block. In YUV modes, the instances are connected to their corresponding interfaces in the scaler interface block 102 and each overflow logic block is active. In RGB mode, the U and V overflow logic blocks are inactive. The Y overflow logic block is active and routed to the DCI block 103, which itself is coupled to the RGB port of the scaler interface block 102.

The DCI block 103 supplies a 32 bit data dword that is defined as valid when a DATA_EN signal 504 driven by the DCI block 103 is active. The dword has four byte enables associated with it. When all four byte enables signals (at 511) are inactive, the dword has been clipped by the DCI block 103, and is not written to the pixel FIFO as data. The overflow block 104 will instead increment the overflow counter 501.

The DCI block 103 also indicates to the overflow block 104 the end of each active horizontal line with a EOL signal 506, which is active for a single clock cycle. The DCI block informs the overflow logic block of the start of each field with a SOF signal 507. The DATA_EN, EOL, and SOF signals are mutually exclusive.

The Y, U and V overflow logic blocks feed into their respective pixel FIFO partitions in pixel FIFO 105. In RGB mode, the Y overflow logic block goes to the Y FIFO, whereas the U and V FIFOs do not exist—their memory space is used in part to increase the size of the Y FIFO. An additional 32 dwords are reserved for holding DCI clip lists.

The overflow block 104 communicates with the pixel FIFO as follows. The overflow block 104 asserts a FIFOREQ signal from the rising edge of the PCICLK signal 503 when the overflow logic block has data or a control word to transfer to the pixel FIFO 105. The pixel FIFO drives back a FIFOACK signal (not shown) to indicate that it will store the data in the pixel FIFO on the next cycle of the PCICLK signal. In other words, data is stored in the pixel FIFO on the rising edge of the PCICLK signal if the FIFOACK signal is driven active. When the overflow logic block samples the FIFOACK signal active, it deasserts the FIFOREQ signal if there is no more data or control information to transfer to the pixel FIFO.

The pixel FIFO also outputs a FIFOFULL status bit (not shown) to indicate whether the pixel FIFO will be able to service the next FIFOREQ signal in a timely manner, i.e., in time to empty the data register 502 of the overflow block 104 before the data register is needed by the next incoming dword from the DCI block 103. The FIFOFULL signal is used by the overflow block 104 to determine whether the overflow logic block should plan to transfer an incoming dword to the pixel FIFO 105 as data, or instead increment the overflow counter 501.

Configuration Registers

The overflow block 104 has a configuration register—the stride register 509. In the preferred embodiment of the present invention, the stride register 509 is implemented using flip-flops. The stride register clocks in data when a PCI target interface port (PCI TIP) 510 detects that it is the target of a PCI or Register Programming Sequencer (RPS) 108 access. The stride register 509 is synchronously reset to all zeros by a RESET signal 505 being sampled active on the rising edge of the PCICLK signal 503. The stride register is 32 bits in length. It may be written to on a byte basis, as it samples the byte enable signals (at 511) as well as a write enable signal before clocking data into the stride register.

The stride register value is used to write a control word into the pixel FIFO that causes the DMA address pointer in the video DMA controller 106 to be modified by the addition of the stride value. The addition may be implemented using a 32-bit adder 512. Addition of a negative stride is accomplished by adding a value that causes an address wraparound.

Status Registers 513

The overflow block 104 maintains an overflow counter 501 that indicates the number of overflows that are detected during the current field. The counter can be read by the RPS 108 or a PCI bus master. The counter appears at bits (15:0) of a status register, a read-only register illustrated in FIG. 14 as the overflow log register 513. The overflow log register 513 helps software ascertain the amount of overflows that an embodiment of the present invention is incurring due to bandwidth limitations on the PCI bus 115. A log count can be written to PCI memory 111 for every video capture frame.

The overflow log register 513 contents should only be read during vertical sync (VSYNC) time, when all overflows for the preceding frame have been logged and no new overflows are occurring, thus allowing a window of about 1 ms for the RPS 108 to access the overflow log register to write its contents to PCI memory 111.

When a new field begins, the overflow log register is reset to zero, in contrast to the overflow counter 501, which is not reset until its contents have been written into the pixel FIFO.

PCI Target Interface Port 510

The overflow block 104 also contains a PCI target interface port (PCI TIP) 510. The PCI TIP writes to the stride register 509 and reads back the contents of the stride register and the overflow log register 513. When the overflow log register is selected, the target read data (TRDATA) bus 514, bits (31:16) are driven to 0000(h).

The PCI TIP 510 self-decodes the overflow logic block's address, and drives a SEL signal 515 when it decodes that it is the active target. The SEL signal 515 indicates which PCI target's data to present to the PCI interface block (PIB) 109. The PCI TIP 510 follows the protocol specified in the PCI Target Unit Interface Specification. The use of a general PCI TIP 510 allows the overflow block 104 to be configured in an identical fashion by either the RPS 108 or by the host via the PCI interface block (PIB) 109. The PCI TIP will return a TXRDY signal 516 in time for the next rising PCI clock edge after a TXCYC signal 517 goes active.

Operation

Figure 15:
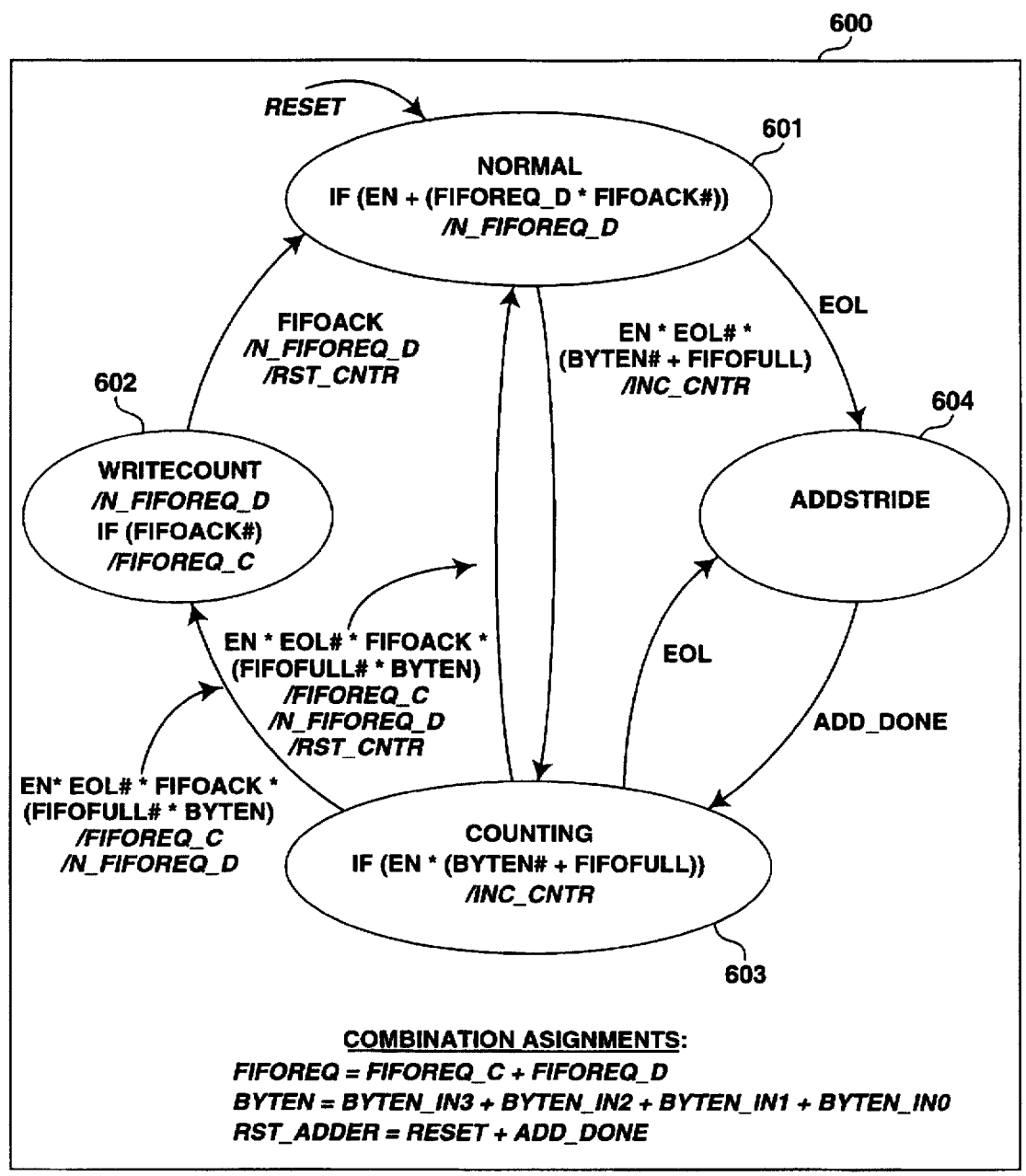
FIG. 15 is a finite state machine diagram illustrating the operation of the overflow block 104 from FIGS. 4 and 14.

With reference to the block diagram illustrated in FIG. 14 and the state machine diagram 600 illustrated in FIG. 15, the operation of the overflow block 104 is as follows. In a normal state 601, the data from the DCI block is clocked into the data register 502. The DATA_EN signal 504 is sampled on the rising edge of PCICLK signal 503. If the pixel FIFO 105 is not full, the overflow block 104 asserts the FIFOREQ signal from the edge of the clock cycle that clocks the data into the data register 502. The FIFOACK signal (not shown) is returned from the pixel FIFO 105 to signal that the transfer has been accepted by the pixel FIFO. The FIFOREQ signal is deasserted from the rising edge of the clock when the FIFOACK signal is sampled active, unless the DATA_EN signal 504 is sampled active.

The above protocol depends on the FIFOACK signal being returned in a timely manner in response to the FIFOREQ signal. For RGB24 modes, this may require a transfer per cycle of the PCICLK signal. The pixel FIFO needs to support transfer rates of sufficient speed for the described embodiment of the present invention to operate properly. In YUV16 mode, the greatest FIFOREQ/FIFOACK latency will exist for the V overflow logic block. The V pixel FIFO must service the overflow logic block in sufficient time to prevent an overflow at the data register when the next data comes in from the DCI block.

A description of the overflow logic block responding to the pixel FIFO being full, or a dword coming in from the DCI block with all byte enables inactive (DCI clip region) follows. Both of these scenarios are handled in the same manner by the overflow logic block 104. The DATA_EN, FIFOFULL, and byte enable signals are sampled with the rising edge of the PCICLK signal 503. If the DATA_EN signal is asserted and the FIFOFULL or all byte enable signals are inactive, then the overflow counter 501 is incremented by four. Thus, the counter acts as a byte counter. Incrementing by four indicates the overflow logic block will not write a full dword to PCI memory 111. The overflow logic block will then move to a counting state 603.

In the counting state 603, each transfer from the DCI block results in the overflow counter being incremented until concurrent with the DATA_EN signal 504 being active (FIFOFULL is inactive and at least one byte enable is active). The decode of this condition results in an immediate, combinatorial-generated FIFOREQ signal, with a data/counter multiplexor 518 selecting input from the overflow counter 501, which in turn, results in a write of the overflow counter to the pixel FIFO 105. All byte enables of the data written to the pixel FIFO are inactive, so that the video DMA controller 106 recognizes this as a control word whose function is to increment a DMA counter in video DMA controller 106.

If the FIFOREQ signal is acknowledged immediately, i.e., during the same clock cycle, then the overflow block 104 transitions immediately back to the normal state 601. The transition can occur because the data/counter multiplexor 518 only needs to select the overflow counter 501 for a single state. In the normal state, another FIFOREQ signal is issued to write the incoming data to the pixel FIFO.

If the FIFOREQ signal is not acknowledged immediately, the overflow logic transitions to a writecount state 602, where it remains until it receives an acknowledge signal (FIFOACK) from the pixel FIFO. When the FIFOACK signal is returned from the pixel FIFO, the FIFOREQ signal will remain active, and the multiplexor 518 selects input from the data register 502, resulting in a transfer of data from the data register to the pixel FIFO.

The data following the write of the overflow counter contents to the pixel FIFO is the first real data coming in after a period of FIFOFULL, or clipped dwords, or a stride adjustment. The key to proper resumption of data transfer is the combinatorial FIFOREQ signal that is generated from conditions sampled prior to data being actually loaded into the data register 502, thus allowing a quick transition from overflow counting to resuming a dword per PCICLK transfer rate.

The overflow counter 501 is reset on the rising edge of the PCICLK signal where the FIFOACK signal is sampled active in response to the combinatorial FIFOREQ signal.

A stride increment is added to the contents of the overflow counter 501 after each horizontal video scan line. At the end of each line, the scaler interface block 102 signals that the horizontal line is complete with the EOL signal 506. The EOL signal transitions the overflow logic into an addstride state 604. In the addstride state, the adder 512 is active—it performs a 32-bit add of the stride register value to the value present in the overflow counter.

Once the results of the stride addition have been loaded into the overflow counter 501, the overflow block 104 moves to the counting state 603. The overflow logic remains in this state until a non-clipped dword is received and the pixel FIFO is not full. When the dword is received, the overflow counter value, followed by the new data word, are written into the pixel FIFO on consecutive accesses. As a result, the stride value remains in the overflow counter until the next data word is received.

Note the similarity in handling of stride values, DCI clip words, and pixel FIFO full conditions. Once one of these conditions occur, the overflow counter goes to a non-zero value. The overflow counter contents will not be written to the pixel FIFO until a valid dword is received and there is enough space in the pixel FIFO to accept both the overflow counter contents and the valid data word. Thus, the full signal should not be driven inactive from the pixel FIFO until there are at least two dwords free in the pixel FIFO.

Control Logic

The following table describes the internally generated control signals that are used within the overflow logic block 104.

| Signal Name | Description |
|---|---|
| ADD_DONE | Goes active for a clock cycle to indicate that the adder has finished its 32-clock addition operation. Will also cause the overflow counter to be loaded with the adder result on the next rising edge of PCICLK. |
| FIFOREQ_C | Combinatorial FIFOREQ. Is asserted when the overflow logic block wants to write the contents of the overflow counter into the pixel FIFO. Also causes the data/counter multiplexor to select as input either the data register or overflow counter contents to the DOUT(31:0) bus. If the data register path is selected, its byte enable signals will be steered to BYTEN_OUT(3:0). If the overflow counter is selected, the multiplexor will drive logic LO outputs on BYTEN_OUT(3:0). |
| INC_CNTR | When this signal is active at the rising edge of PCICLK, the counter will add 4 to its present value. This signal goes active due to either a pixel FIFO full condition when a new dword is arriving from upstream, or when the new dword has all its byte enables inactive. |
| RESET | Buffered version to TSRESET. |
| RST_ADDER | Resets the adder logic. This reset is performed at block reset time, and when ADD_DONE is active. Therefore, it is simply: (RESET OR ADD_DONE). |
| RST_CNTR | Synchronously resets the overflow counter. Active at block reset time, and when FIFOACK is returned in response to a FIFOREQ initiated to write the counter contents into the FIFO. |
| STRIDEREG_LD | Enables the loading of the stride register from the data presented on the TWDATA(31:0) bus. Driven by PCI target interface when a target cycle to the stride register is decoded. |

Pixel FIFO 105

The pixel FIFO 105 is used to buffer video data while an embodiment of the present invention is waiting for access to PCI bus 115. The size and number of FIFOs can be changed under program control. A general purpose access port is also created for functions which do not require FIFO behavior.

The pixel FIFO 105 can accept write requests from the scaler interface block 102, the DCI block 103, or the RPS block 108. Writes from the scaler interface block function as writes to a FIFO. Writes from the DCI block or RPS function as writes to PCI memory 111.

In the preferred embodiment of the present invention, the pixel FIFO 105 can be programmed to emulate the behavior of up to 3 FIFOs. The size of each of the FIFOs is programmed by a FIFO configuration register, defined as follows:

| FIFO Configuration Register |||||||
|---|---|---|---|---|---|---|
| D31:28 | D27:24 | D23 | D22:16 | D15:13 | D12:8 | D7:5 | D4:0 |
| 0 | FIFO Config | 0 | Y Trip Point | 0 | U Trip Point | 0 | V Trip Point |

It should be noted that the trip point values and FIFO sizes are indicated in dwords.

| FIFO Configuration Bit Definitions |||||
|---|---|---|---|---|---|
| FIFO Config | Mode | Y FIFO size | U FIFO size | V FIFO size | Comments |
| Fh | YUV-16 | 64 | 32 | 32 | Planar Mode with horizontal chroma filtering |
| Eh | YUV-12 | 64 | 32 | 32 | Planar Mode with horizontal chroma filtering |
| Dh | YUV-9 | 80 | 24 | 24 | Planar Mode with horizontal chroma filtering |
| Bh | YUV-16 | 64 | 32 | 32 | Planar Mode |
| Ah | YUV-12 | 64 | 32 | 32 | Planar Mode |
| 9 | YUV-9 | 80 | 24 | 24 | Planar mode |
| 8 | YUV-8 | 128 | 0 | 0 | Monochrome |
| 7 | RGB-32(24)** | 96 | 16* | 16* | DCI enabled |
| 5 | RGB-16 | 96 | 16* | 16* | DCI enabled |
| 3 | RGB-32(24)** | 128 | 0 | 0 | Packed Pixel mode |
| 1 | RGB-16 | 128 | 0 | 0 | Packed Pixel mode |

*Note:
In RGB modes with DCI enabled, the U and V FIFOs are used to hold the clipping tile descriptors, and do not operate as data FIFOs.
**Note:
Two RGB32(24) formats are available. If Pixel Bit Shift = 0 then the data format is RGBx. If Pixel Bit Shift = 1 then the data format is xRGB.

The trip points of the FIFOs are programmable up to the maximum size of the FIFO. Selection of the trip point is dependent on the size of the image being captured, and the behavior of the PCI bus 115 in the host computer. The present invention is most efficient when long bursts of data are sent to the PCI bus 115, thus indicating a higher trip point. However, setting the trip point too high makes the present invention more susceptible to FIFO overflow when long PCI bus latencies are incurred.

For systems that allow long bursts of data, the recommended starting value for the trip points is at half the FIFO size. For systems that limit the length of PCI bursts to 16 bytes or less, the recommended starting value for the trip points is four dwords. In either case, software tuning is generally needed.

The operation of the FIFOs is driven by the output of the scaler interface block 102. Valid pixels are loaded into the pixel FIFO 105, and the video DMA controller 106 compares the number of valid entries in the pixel FIFO partitions to the trip register(s), and issues a request for the PCI bus 115 at the appropriate time. This process will repeat itself until the end of a field. The scaler interface block indicates the end of a field. At the end of a field, the pixel FIFO requests the video DMA controllers to flush the FIFOs.

FIFO Overflow

FIFO overflow occurs when excessive PCI bus latency is encountered. The amount of latency that the preferred embodiment of the present invention can tolerate is a function of the size and scaling factor of the incoming video image, the mode of storage (YUV16 versus YUV8, planar or packed pixel), the size of the transfers to PCI memory 111, etc. Generally, in systems that limit PCI bus masters to 16 byte transfers, average latencies greater than about 1.5 microseconds causes FIFO overflow. In systems that allow PCI bus masters to perform greater than 64 byte transfers, average latencies of greater than about 5 microseconds causes FIFO overflow.

Overflow conditions are handled at the front end of the pixel FIFO 105, i.e., the most recently received pixels are discarded. One FIFO entry location is always reserved for signaling an overflow condition. When the pixel FIFO 105 has only a single entry location available (i.e., the pixel FIFO is nearly full) and a 32 bit entry is ready to be loaded into the pixel FIFO, the video data is discarded, and an overflow code indicating a pixel count is entered in place of the video data. Multiple video data overflows increase the count value that is entered into the pixel FIFO. When the video DMA controller 106 reads the FIFO entries and decodes an overflow code, it uses the count value to increment its counters to keep the subsequent pixels in the correct position in the bit map. This has the effect of leaving gaps or holds in the bit map. If the same memory space is used for the frame buffers, the video data from some previous frame appears in the hole created by the overflow. Finally, a corrupted frame status bit is set, and a hardware interrupt is generated if enabled when an overflow condition occurs.

Video DMA Controller 106

In a preferred embodiment of the present invention, video DMA controller 106 functions as three separate video DMA controllers, one each for Y, U, and V bit maps (for packed pixel operation, only the Y DMA channel is programmed). The video DMA controllers can be programmed to deliver bit maps to anywhere in a four gigabyte PCI memory space 111. The video DMA controllers perform byte aligned transfers. The pitch of the bit maps is programmable in byte increments. Thus, a 32 bit (stride) value is added to the address at the end of an active line. This allows for address rollover (negative pitch). It should be noted that pitch is the difference between the address of the first pixel on a line and the first pixel on the next line, whereas stride is the difference between the address of the last pixel on a line and the first pixel on the next line. Memory locations that are skipped over by using the stride register are not written, and remain unchanged.

Each of the video DMA controllers has its own starting address pointer, and shares a set of limit registers. The set of limit registers have an upper and lower limit. DMA requests for an address out of range do not result in a bus cycle and stop a DMA operation. Moreover, an interrupt is generated (if enabled). DMA requests are triggered by programmable trip points by a register used to configure and allocate FIFOs in pixel FIFO 105.

DMA registers are working registers, e.g., the host or RPS 108 should write to the DMA registers only when they are not actively processing a field (i.e., during vertical blank time). The registers should be written 32 bits at a time.

The pixel FIFOs each have an independent programmable trip point for generating bus cycles via the video DMA controller 106 to the PCI interface block (PIB) 109. After the PIB 109 has acknowledged a request, the video DMA controller 106 drives address and enable data from the pixel FIFOs. At the beginning of a scan line, a non dword aligned access may occur if the starting address is programmed for a non dword aligned transfer. Thereafter, all the cycles will be 32 bit aligned write cycles until the end of a line where an aligned non 32 bit transfer may happen. Because of the consecutive nature of the data, the PIB 109 will continue to accept requests from the video DMA controller 106 and perform burst cycles to the PCI bus 115. In planar mode, the maximum number of transfers for the Y pixel FIFO is 64, for the U and V pixel FIFOs, 32. In packed pixel mode, the maximum number of transfers is approximately 96 when the DCI block 103 is enabled, and approximately 128 when DCI block is disabled.

PCI Interface Block (PIB) 109

The PCI interface block (PIB) 109 interfaces with the PCI bus 115. The PIB acts as a target for accesses to registers internal to the embodiment 100 of the present invention from the host. The PIB 109 operates as a PCI bus master when the video DMA controller is delivering captured video images to PCI memory 111, the RPS 108 is accessing PCI memory 111 for register value lists or writing data, and the DCI block 103 is fetching data. The PIB can access up to four gigabytes of memory space via the PCI bus 115.

Register Programming Sequencer (RPS) 108

Overview

The Register Programming Sequencer (RPS) 108 is used to program a set of working registers in video DMA controller 106 in accordance with a list of register addresses and values/memory addresses held in PCI memory 111. Operation of the RPS is initiated on a command or on the VSYNC signal. A register block is maintained in PCI memory 111. The RPS 108 reads in the register addresses and values (for write cycles) or memory addresses (for read cycles) in the list and performs reads and writes to the working registers according to the list. At host reset, the RPS 108 is disabled from fetching register data from PCI memory 111.

A command list is built in PCI memory 111 by the host software. The list is made up of pairs of dwords that contain the control/address components in a first command dword and the data component in a second command dword. The RPS programs the working registers and IIC registers in IIC interface block 101 based on the command list. The structure of the control and address components of the first command dword is as follows:

| Command dword | | | | | | |
|---|---|---|---|---|---|---|
| D31 | D30 | D29 | D28:D24 | D23:D16 | D15:D8 | D7:D0 |
| Cont | R/W# | Int | Reserved | Reserved | Reserved | Register OffsetAddress |

When the continue (cont) bit is set (1), the RPS fetches the next command dword pair. When it is cleared (0), it stops with a RPS address pointer pointing at the next command dword (address of the command dword with cont bit=0, plus 8). The R/W# bit indicates read or write operation, wherein 1=read, 0=write. If the interrupt (int) bit is set (1), an interrupt is generated when the command has completed. The register address is a target register address offset from which to read or write. All reserved bits should be written as zeros and ignored during read cycles.

If the first command dword has the R/W# bit set (indicating a read cycle) then the second command dword following the first command dword contains the address in PCI memory 111 where the data read from a working register is written. If the command dword has the R/W# bit reset (indicating a write cycle) then the second command dword contains the value to be written to the working register. Multiple command lists can be built and linked by programming a RPSADR register at the end of a register update command list (the RPSADR register is similar in operation to a program counter).

It is recommended that an IIC programming register update be performed at the beginning of the command list, with the cont bit cleared at the end of the IIC programming portion, before the next set of working register updates. Because the IIC registers are shadowed in the video decoder/ scaler 117, their effects are not seen until the next field. This allows the IIC registers to be updated during the active field for the next active field. The next VSYNC signal starts the RPS again, and programs the working registers for a subsequent field in the incoming video signal.

The RPS starts fetching commands from the beginning of the command list at a memory location pointed to by the RPSADR register. The RPS continues to fetch commands until it reads a command with the cont bit reset (0), at which time, it stops fetching commands. If the command list is completely processed by the rising edge of the next VSYNC signal, then an error is deemed to have occurred and an interrupt may be generated to disable the RPS 108.

Operation

Figure 16:
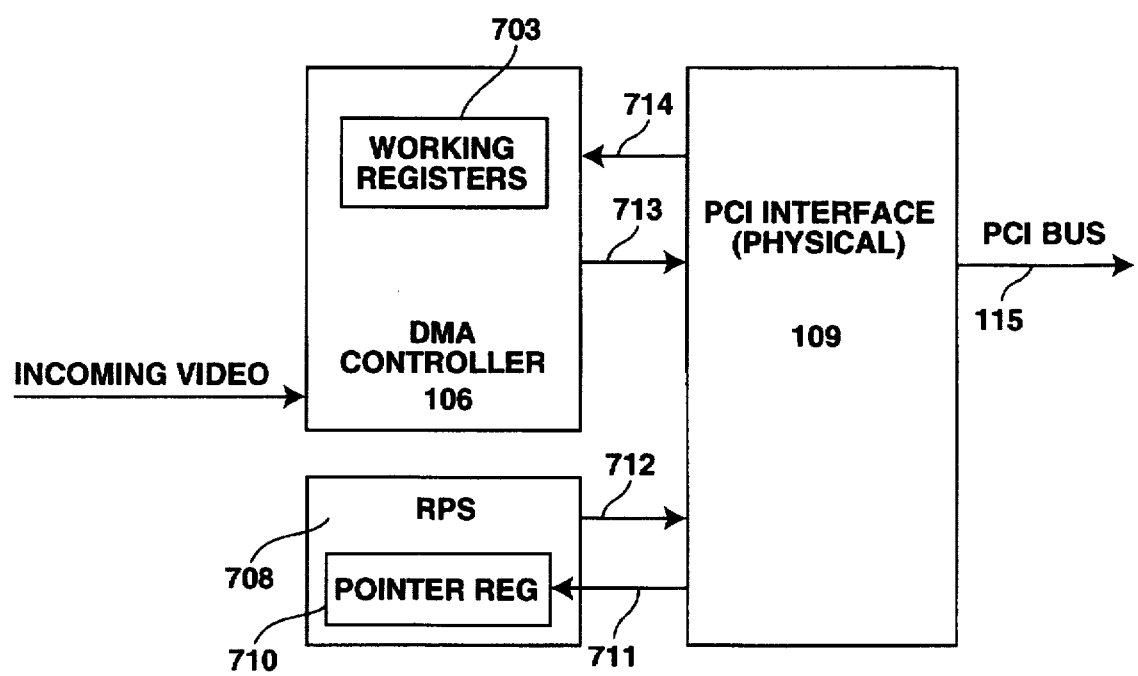
FIG. 16 is a block diagram of an embodiment of the present invention for managing buffers in memory by means other than host processor control.

With reference to FIG. 16, the RPS 108 operates as a PCI bus 115 master to read sets of register settings from the command list in PCI memory 111 and load them into the working registers 703 in the video DMA controller 106. The loading of the register settings is performed in response to the VSYNC signal from the video decoder/scaler 117. The VSYNC signal indicates the boundary between two fields and that no video data is currently being received. The VSYNC signal triggers the RPS 108 to generate PCI reads to the PCI memory location 111 pointed to by a pointer register in the DMA controller 106.

Linked lists of commands, in which register settings are stored, are preloaded into PCI memory 111 before the RPS 108 is enabled. The linked lists may have any number of commands, wherein a command comprises two dwords. The first command dword contains control information and the working register address. If the control information indicates a write operation, the second command dword contains the register contents to be written to the addressed working register. The contents are context sensitive depending on the addressed working register to which the contents are written. In some cases, the contents are address pointers to PCI memory 111 or graphics memory 113. In other cases, the contents may be control information. The video DMA controller may process a sequence of commands in the command list to set up access to a video data buffer. Thus, in the preferred embodiment, the command list, created by the host under software control, is used by the video DMA controller 106 to access video data buffers in graphics memory. It is understood by those of ordinary skill in the art, however, that such buffers could be accessed in any memory, whether main memory, e.g., PCI memory 111, or graphics memory 113. If, however, the control information in the first command dword indicates a read operation, the second command dword which contains the data component, specifies a PCI memory 111 address to which to write the contents of the working register specified by the address component of the first command dword. A write operation may occur, for example, when status information in a working register, e.g., status regarding an overflow condition, is saved to memory for some reason. A read/write bit is part of the control information contained in the first command dword. Other control bits are used for generating interrupts on a specific register access and to continue the processing of the register list.

When the continue bit is cleared (set to zero), the processing of the list is stopped. The pointer register is then pointing at the next command in the linked list. The next VSYNC signal event restarts the RPS 108, and the next register set, i.e., the next command in the command list, is processed. Under normal operation, the continue bit is reset in the last command of a command list. Writes to the pointer register by the RPS 108 is allowed and has the effect of an unconditional jump.

Figure 17:
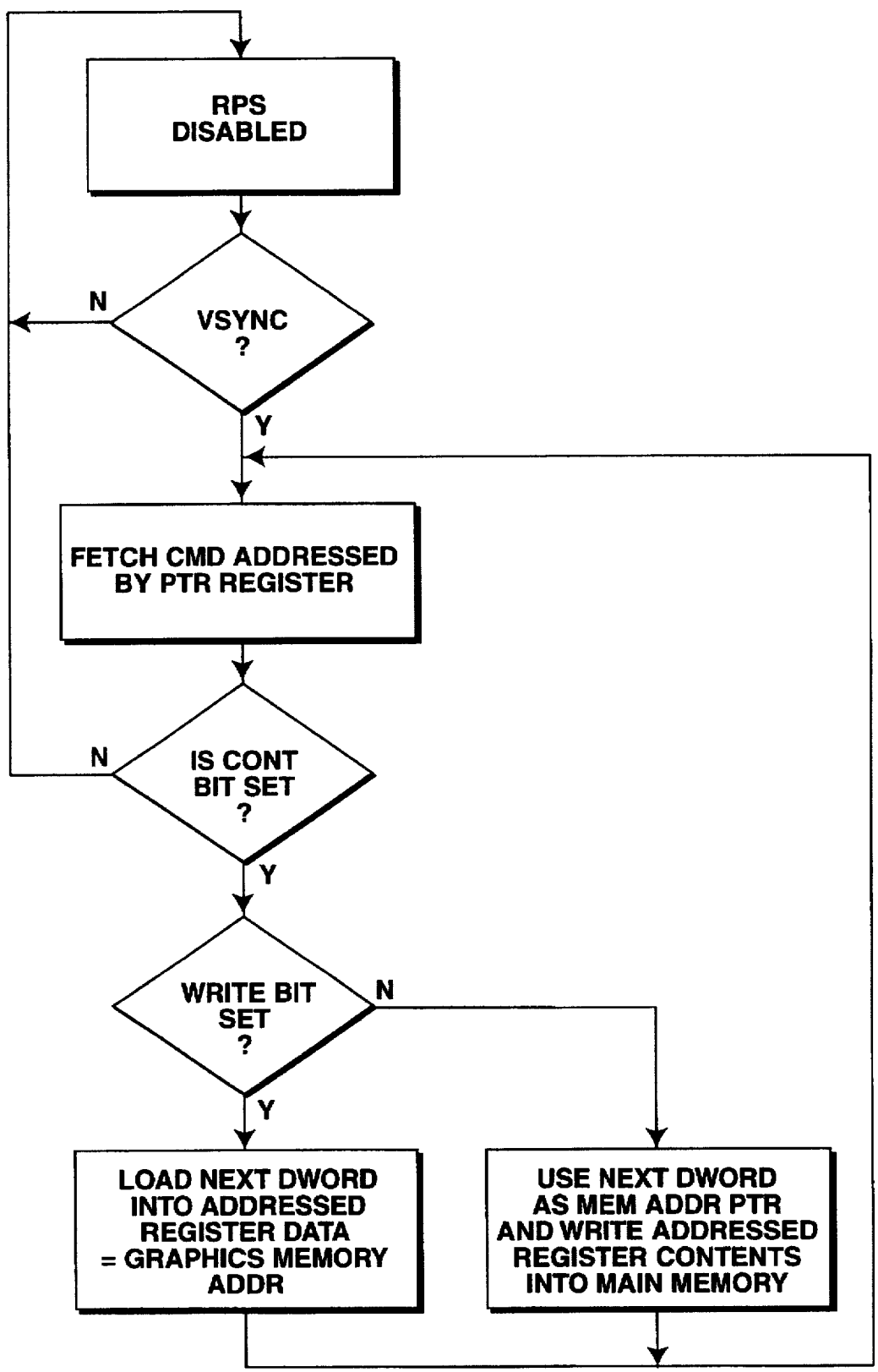
FIG. 17 is a flow chart of a method for managing buffers in memory by means other than host processor control as embodied by the present invention.

The host processor and software can create one or more command lists in PCI memory 111 with as many sets of register settings as the memory space allows. The register sets may point to any number of video data buffers, and, depending on the commands associated with the registers, may be used to throttle incoming video fields. The operation of RPS 108 is further described with reference to the flow chart in FIG. 17.

Thus, a method and apparatus for coupling a video camera and videodecoder/scaler to a host computer has been described. The specific apparatus and details set forth herein are illustrative of, but not limited to, an embodiment in which the present invention can be employed.

We claim:

1. In a video interface coupling a video camera to a host for displaying a video image from said video camera on a graphics display device coupled to said host, a method for clipping an obscured region of said video image before transferring said video image to a graphics memory coupled to said graphics display device, comprising the steps of:

reading a list in a main memory of said host, said list comprising a strip descriptor and a tile descriptor, said strip descriptor comprising a strip start and a strip end, said tile descriptor comprising a tile start and a tile length;

clipping said video image from said tile start for said tile length while a scan line of said video image is≧said strip start and≦said strip end.

2. In a video interface coupling a video camera to a host, said host having a main memory, a graphics memory and a graphics display device, for displaying a video image received from said video camera on said graphics display device, a method for clipping an obscured region of said video image before transferring said video image to said graphics memory, comprising the steps of:

said video interface reading a list in main memory, said list comprising a strip descriptor and a tile descriptor, said strip descriptor comprising a strip start and a strip end, said tile descriptor comprising a tile start and a tile length;

said video interface clipping said video image from said tile start for said tile length while a scan line of said video image is ≧ said strip start and ≦ said strip end.

3. In a video interface coupling a video camera to a host, said host having a graphics memory, a main memory, and a graphics display device, for transferring a video image received from said video camera to said graphics memory, an apparatus for determining, before transferring said video image to said graphics memory, a region of said video image that will be obscured on said graphics display device by an overlaying window, comprising:

a clip list in said main memory comprising a strip descriptor and a tile descriptor;

a strip descriptor register for holding said strip descriptor;

a memory for holding said tile descriptor;

means for loading from said clip list in said main memory said strip descriptor and said tile descriptor respectively into said strip descriptor register and said memory;

a line counter for determining when a scan line of said video image is at a start of a strip according to said strip descriptor in said strip descriptor register;

a comparator for determining when a pixel of said scan line of said video image is at a start of a tile according to said tile descriptor in said memory;

a tile length counter for determining when said pixel of said scan line of said video image is at an end of said tile according to said tile descriptor in said memory.

4. In a video interface coupling a video camera to a host, said host having a main memory, a graphics memory and a graphics display device, for displaying a video image received from said video camera on said graphics display device, a method for clipping a plurality of obscured regions of said video image before transferring said video image to said graphics memory, wherein one of said plurality of obscured regions is identified by a strip and a tile, comprising the steps of:

a) reading an entry from a list in main memory on said host, said entry comprising:

i) a strip descriptor comprising a strip start and a strip end of said strip, and, ii) a plurality of tile descriptors associated with said strip descriptor, wherein one of said plurality of tile descriptors comprises a tile start and a tile length of said tile;

b) for each scan line of said video image in said strip as determined by said strip start and said strip end, and for each said tile in said strip as determined by said tile start and said tile end:

A) initiating clipping of said video image when a pixel in said scan line is at said tile start of said tile; and, B) stopping clipping of said video image when said pixel in said scan line is at said tile end of said tile; and, c) repeating steps a through b for each said entry in said list.

* * * * *